(12) United States Patent
Lauritsen

(10) Patent No.: US 8,346,681 B2
(45) Date of Patent: Jan. 1, 2013

(54) SYSTEM AND METHOD FOR DECISION SUPPORT

(75) Inventor: Marc Richard Lauritsen, Harvard, MA (US)

(73) Assignee: All ABout Choice, Inc., Harvard, MA (US)

( * ) Notice: Subject to any disclaimer, the term of this patent is extended or adjusted under 35 U.S.C. 154(b) by 486 days.

(21) Appl. No.: 12/551,139

(22) Filed: Aug. 31, 2009

(65) Prior Publication Data

US 2010/0057645 A1 Mar. 4, 2010

Related U.S. Application Data

(60) Provisional application No. 61/190,526, filed on Aug. 30, 2008.

(51) Int. Cl.
*G06F 17/00* (2006.01)
*G06F 3/00* (2006.01)
(52) U.S. Cl. .............................. 706/11; 706/45; 715/700
(58) Field of Classification Search .................. None
See application file for complete search history.

(56) References Cited

U.S. PATENT DOCUMENTS

| | | | | |
|---|---|---|---|---|
| 5,995,728 | A | 11/1999 | Forman | 395/500 |
| 6,366,905 | B1 | 4/2002 | Netz | 707/3 |
| 6,772,019 | B2 | 8/2004 | Karas | 700/52 |
| 6,850,891 | B1 | 2/2005 | Forman | 705/7 |
| 6,877,006 | B1 | 4/2005 | Vasudevan | 707/10 |
| 6,915,269 | B1 | 7/2005 | Shapiro et al. | 705/10 |
| 7,167,864 | B1 | 1/2007 | Vasudevan | 707/10 |
| 7,184,968 | B2 | 2/2007 | Shapiro et al. | 705/10 |
| 7,720,861 | B1 | 5/2010 | Vasudevan | 707/770 |
| 2002/0049738 | A1 | 4/2002 | Epstein | 707/1 |
| 2004/0186738 | A1 | 9/2004 | Reisman | 705/1 |
| 2005/0091012 | A1 | 4/2005 | Przytula et al. | 703/2 |
| 2006/0062363 | A1 | 3/2006 | Albrett | 379/101.01 |
| 2007/0087756 | A1 | 4/2007 | Hoffberg | 455/450 |
| 2007/0162319 | A1 | 7/2007 | Shapiro et al. | 705/8 |
| 2008/0190272 | A1 | 8/2008 | Taub et al. | 84/645 |

OTHER PUBLICATIONS

International Searching Authority, International Search Report—International Application No. PCT/US2009/04910, dated Oct. 2, 2009, together with the Written Opinion of the International Searching Authority, 8 pages.

Harvey J. Miller et al., Discovering Geographic Knowledge in Data Rich Environments, Report of a Specialist Meeting held under the auspices of the Varenius Project, Oct. 8, 1999, 64 pages.

Carenini et al., "ValueCharts: Analyzing Linear Models Expressing Preferences and Evaluations," University of British Columbia, Department of Computer Science, pp. 150-157, 2004.

Chaudhuri et al., "An Overview of Data Warehousing and OLAP Technology," ACM Sigmod Record, Mar. 1997, 10 pages.

(Continued)

*Primary Examiner* — Alan Chen
(74) *Attorney, Agent, or Firm* — Sunstein Kann Murhpy & Timbers LLP

(57) ABSTRACT

Embodiments of the present invention use a construct referred to herein as a "choicebox" to support choice-making within a conceptual choicespace. The choicebox allows the identification of one or more options, one or more factors, and one or more perspectives for a particular choice. Each choice is associated with one or more categories. The options, factors, and perspectives are logically mapped to imagined x, y, and z axes and can be envisioned and graphically represented as a three-dimensional assessment matrix or box. Within the context of the present invention, choiceboxing is the activity of deliberating about a choice using such matrices. Choiceboxes are built and manipulated using software that renders their data into visual and interactive form. They serve as shareable places for collaborative deliberation.

42 Claims, 33 Drawing Sheets

[A subset of one exploratory box, just to illustrate possible look & feel; math is off due to missing rows]

OTHER PUBLICATIONS

Gopalkrishnan et al., "Conceptual Object Modeling for OLAP Cubes in a Data Warehousing Environment," City University of Hong Kong Strategic Research Grants, Undated, 10 pages.

Gray et al., "Data Cube: A Relational Aggregation Operator Generalizing Group-By, Cross-Tab, and Sub-Totals," Microsoft Technical Report, 13 pages, Feb. 5, 1995.

Jarke et al., "Mediator: Towards a Negotiation Support System," Center for Digital Economy Research, 48 pages, May 1985.

Lauritsen, "Intelligent Tools for Managing Legal Choices," ICAIL, 5 pages, Jun. 6-10, 2011.

Mustajoki et al., "Web-HIPRE: Global Decision Support by Value Tree and AHP Analysis," Systems Analysis Laboratory, Helsinki University of Technology, 21 pages, Dec. 17, 1999.

Niemi et al., "Constructing OLAP Cubes Based on Queries," Department of Computer and Information Sciences, Undated, 7 pages.

Rigopoulos et al., "Web Support System for Group Collaborative Decisions," Journal of Applied Sciences, vol. 8, pp. 407-419, 2008.

Three Mode Software, "3WAYPACK," Rijks Universiteit Leiden, 21 pages, Sep. 18, 1997.

Wikipedia website, "OLAP cube," http://en.wikipedia.org/wiki/OLAP_cube, 5 pages, May 24, 2012.

9. Installed base

Please rate your options on Installed base
(Approximately how many copies are installed on customer desktops.)

|     | Jane    | Judy | Jack    |
|-----|---------|------|---------|
| DA1 | 800     | 1    | 2,000   |
| DA2 | 5,000   | 3    | 20,000  |
| DA3 | 3,000   | 2    | 6,000   |
| DA4 | 250,000 | 4    | 400,000 |

Show ⦿ input  ○ scores

[ Next ]  [ Previous ]  [ Close ]

*Figure 15*

10. Browser mode

Please rate your options on Browser mode
(Does the software work with only a browser?)

|     | Jane | Judy | Jack |
|-----|------|------|------|
| DA1 | ☐    | ☐    | ☐    |
| DA2 | ☐    | ☐    | ☐    |
| DA3 | ☑    | ☑    | ☑    |
| DA4 | ☑    | ☑    | ☑    |

Show ⦿ input  ○ scores

[ Next ]  [ Previous ]  [ Close ]

*Figure 16*

| | DA1 | DA2 | DA3 | DA4 |
|---|---|---|---|---|
| Installed base<br>Weight: 10 | 0.32 | 2 | 1.2 | 100 |
| Browser mode<br>Weight: | 0 | 0 | 100 | 100 |
| Signing bonus<br>Weight: 10 | 0 | 0 | 100 | 0 |
| Power<br>Weight: 10 | 44.44 | 100 | 77.77 | 77.77 |
| License cost<br>Weight: 5 | -9.9 | -25 | -100 | -35 |
| More than 2yr<br>Weight: 10 | 0 | 100 | 100 | 100 |
| Weighted total | 398.14 | 1,895 | 2,289.77 | 2,602.77 |

Show ○ input  ● scores          Explain [1] Guide me [2]

[Next]  [Previous]  [Resources]  [Close]

*Figure 18*

2. Box View - Judy Perspective

```
                 |   DA1   |   DA2   |   DA3   |   DA4
Installed base   |   25    |   75    |   50    |   100
    Weight:  7   |         |         |         |
Browser mode     |    0    |    0    |   100   |   100
    Weight:  8   |         |         |         |
Signing bonus    |    0    |    0    |   100   |    0
    Weight: 10   |         |         |         |
Power            |   60    |   100   |   80    |   80
    Weight:  9   |         |         |         |
License cost     |  -9.9   |  -25    |  -100   |  -35
    Weight:  6   |         |         |         |
More than 2yr    |    0    |   100   |   100   |   100
    Weight:  5   |         |         |         |

Weighted total  |  655.6   |  1,775  |  2,770  |  2,510

Show  ○ input   ● scores         Explain [1] Guide me [2]

[ Next ]   [ Previous ]  [ Resources ]  [ Close ]
```

*Figure 19*

| | DA1 | DA2 | DA3 | DA4 |
|---|---|---|---|---|
| Installed base<br>  Weight:    5 | 0.5 | 5 | 1.5 | 100 |
| Browser mode<br>  Weight:    3 | 0 | 0 | 100 | 100 |
| Signing bonus<br>  Weight:    5 | 0 | 0 | 100 | 0 |
| Power<br>  Weight:    5 | 62.5 | 100 | 75 | 87.5 |
| License cost<br>  Weight:    4 | -9.9 | -25 | -100 | -35 |
| More than 2yr<br>  Weight:    4 | 0 | 100 | 100 | 100 |
| Weighted total | 275.4 | 825 | 1,182.5 | 1,497.5 |

Show ○ input  ● scores      Explain [1] Guide me [2]

[ Next ]  [ Previous ]  [ Resources ]  [ Close ]

*Figure 20*

| | DA1 | DA2 | DA3 | DA4 |
|---|---|---|---|---|
| Installed base Weight: | 25.82 | 82 | 52.7 | 300 |
| Browser mode Weight: | 0 | 0 | 300 | 300 |
| Signing bonus Weight: | 0 | 0 | 300 | 0 |
| Power Weight: | 166.94 | 300 | 232.77 | 245.27 |
| License cost Weight: | 29.7 | 75 | 300 | 105 |
| More than 2yr Weight: | 0 | 300 | 300 | 300 |
| Weighted total | 1,329.14 | 4,495 | 6,242.27 | 6,610.27 |

Show ○ input ● scores      Explain [1] Guide me [2]

[Next] [Previous] [Resources] [Close]

*Figure 21*

|                  | DA1    | DA2 | DA3    | DA4    |
|------------------|--------|-----|--------|--------|
| Installed base   | 25.82  | 82  | 52.7   | 300    |
| Weight:          |        |     |        |        |
| Browser mode     | 0      | 0   | 300    | 300    |
| Weight:          |        |     |        |        |
| Signing bonus    | 0      | 0   | 300    | 0      |
| Weight:          |        |     |        |        |
| Power            | 166.94 | 300 | 232.77 | 245.27 |
| Weight:          |        |     |        |        |
| License cost     | 29.7   | 75  | 300    | 105    |
| Weight:          |        |     |        |        |
| More than 2yr    | 0      | 300 | 300    | 300    |
| Weight:          |        |     |        |        |
| Votes            | 0      | 0   | 1      | 2      |

Show ○ input  ● scores         Explain [1] Guide me [2]

[ Next ]  [ Previous ]  [ Resources ]  [ Close ]

*Figure 22*

Installed base

Please rate your options on Installed base
(Approximately how many copies are installed on customer desktops.)

|      | Jane | Judy | Jack |
|------|------|------|------|
| DA1  | 0.32 | 25   | 0.5  |
| DA2  | 2    | 75   | 5    |
| DA3  | 1.2  | 50   | 1.5  |
| DA4  | 100  | 100  | 100  |

Show ○ input  ● scores

[Close]

*Figure 26*

Comparative Weights across all Perspectives

|                | Jane | Judy | Jack |
|----------------|------|------|------|
| Installed base | 10   | 7    | 5    |
| Browser mode   | 0    | 8    | 3    |
| Signing bonus  | 10   | 10   | 5    |
| Power          | 10   | 9    | 5    |
| License cost   | 5    | 6    | 4    |
| More than 2yr  | 10   | 5    | 4    |

Show ○ input  ● scores

[Close]

*Figure 27*

Scenario: Allison, Jared, and Susan have been asked to recommend a venue for their company's next staff retreat (families invited).

*Figure 31*

[A subset of one exploratory box, just to illustrate possible look & feel; math is off due to missing rows]

Color and graphics

Example of grid with three-pane cells

| | 1ˢᵗ  1349<br>Law Firm 1 | 3ʳᵈ  927<br>Law Firm 2 | 2ⁿᵈ  1083<br>Law Firm 3 |
|---|---|---|---|
| 2ⁿᵈ  6<br>Expertise | 3ʳᵈ  71%<br>5 | 2ⁿᵈ  85%<br>6 | 1ˢᵗ  100%<br>7 |
| 1ˢᵗ  -8<br>Hourly rate | 1ˢᵗ  -55%<br>$195 | 2ⁿᵈ  -78%<br>$275 | 3ʳᵈ  -100%<br>$350 |
| 3ʳᵈ  5<br>Tech savvy | 2ⁿᵈ  83%<br>5 | 2ⁿᵈ  83%<br>5 | 1ˢᵗ  100%<br>6 |
| 2ⁿᵈ  6<br>Compatibility | 1ˢᵗ  75%<br>6 | 2ⁿᵈ  62%<br>5 | 1ˢᵗ  75%<br>6 |
| 3ʳᵈ  5<br>Convenience | 1ˢᵗ  100%<br>6 | 3ʳᵈ  50%<br>3 | 2ⁿᵈ  66%<br>4 |

 = user-entered weights and ratings

 = computed ranks and scores

 = computed highest ranked option

 = editable text (short names for options and factors)

*Figure 32*

Example of grid with graphics

|  | 1st<br>Law Firm 1 | 3rd<br>Law Firm 2 |
|---|---|---|
| 2nd<br>Expertise | 3rd | 2nd |
| 1st<br>Hourly rate | 1st<br>$195 | 2nd<br>$275 |

Area/volume signifies overall "goodness" (badness)
Height = factor weight; width = score; depth = perspective weight
(In this example green 'volume' in non-displayed rows would more clearly outweigh the red volume)

*Figure 33*

SYSTEM AND METHOD FOR DECISION SUPPORT

CROSS-REFERENCE TO RELATED APPLICATION

This patent application claims the benefit of U.S. Provisional Patent Application No. 61/190,526 entitled THE CHOICEBOX SYSTEM FOR DECISION SUPPORT filed on Aug. 30, 2008, which is hereby incorporated herein by reference in its entirety.

FIELD OF THE INVENTION

The present invention relates generally to decision support systems.

BACKGROUND OF THE INVENTION

People face choices throughout their personal and business lives. Some choices are nearly invisible and instantaneous; others involve extended deliberation. Some choices are made by one person alone; most involve consultation with others.

Most choices relate to things a person or group of people wish to get or do. Some involve alternative conclusions to treat as a basis for action, such as competing hypotheses about a medical diagnosis or a business strategy.

Different types of systems to support certain types of collaboration and decision making have been developed. For example, a collaborative database system is described in United States Patent Application Publication No. 2002/0049738 (Epstein). A decision support system using bilateral and multilateral matching techniques is described in U.S. Pat. Nos. 6,915,269 and 7,184,968 and in United States Patent Application Publication No. US 2007/0162319. Each of these publications and patents is incorporated herein by reference in its entirety.

SUMMARY OF THE INVENTION

In exemplary embodiments of the invention, an integrated system, implemented on local and remote computers with interactive software environments, is used to support the making of choices.

The system includes interfaces through which users define and deliberate about choices, software that presents and manages those interfaces, and software and databases that store and process information and knowledge drawn from user behavior that can be fed back to support users.

Embodiments of a "choiceboxing" system described here makes use of weighted factor analysis and related techniques that involve assessing options on different criteria whose relative importance can be specified.

In accordance with one aspect of the present invention there is provided a computerized method for supporting the making of decisions by one or more decision-making participants. The method involves, in a first computer process, maintaining a repository for storing one or more data sets, each data set including a three-dimensional assessment matrix characterizing one or more options for a decision in terms of one or more factors according to one or more perspectives, each perspective including a rating for each option for each factor and a scoring function for each factor; and in a second computer process, providing access to the repository via a graphical user interface to support interactive decision-making through user-selectable views of data sets including conceptual three-dimensional box views in which the options, factors, and perspectives of an assessment matrix are selectively mapped to the three dimensions of a box and also including conceptual two-dimensional slice views for individual options, factors, and perspectives of the box.

In various alternative embodiments, a total score for each option in a perspective may be calculated based on the ratings and scoring parameters for each factor in the perspective. A summary perspective representing a combination of the perspectives may be displayed. Each perspective may include an independent set of weights, for the various factors, and its own weights relative to other perspectives, so that each factor has a weight in each perspective and each perspective has a weight for each factor, and wherein the combination of the perspectives is based on the perspective weights. The options and factors may be selectively mapped to two orthogonal column and row axes of a box and the user perspectives may be selectively mapped as layers along a third orthogonal axis of the box, where each cell at the intersection of a column, row, and layer represents the characterization of some option in terms of some factor according to some perspective. The data set may include, for each factor, a definition that describes properties of the factor including the rating entries that can be made with respect to options and a default scoring function for converting the rating entries to scores.

The graphical user interface may allow selectively adding, removing, and hiding options, factors and perspectives for box views; may allow users to interactively rotate boxes and re-order box layers; may allow information to be imported and integrated into the assessment matrix of a data set from other data sets and sources; may present sponsor links, related to a category of the decision being made, for integrating information provided by the sponsor as a new perspective in the assessment matrix of a data set, wherein the information is imported from an assessment matrix provided by the sponsor or dynamically added by the sponsor into the new perspective; may allow communication between users for collaborating on the decision being considered (using a data set or otherwise); may include links to relevant resources related to the decision being considered; may allow initiation of commercial and non-commercial transactions related to the decision being considered; may allow ratings, weights, and scoring functions to be specified in ordinal terms for approximate ordering of options; may display the differentiating power of factors based on degree of variance in ratings of options and weights of factors and perspectives; and/or may allow data sets to be viewed independently in different forms by multiple users.

The method may also involve selectively ranking and characterizing options in terms of their relative betterness, computed from scores that in turn are computed from ratings via scoring functions. The method may also involve mining information from the data sets stored in the repository and interactions with the data sets and storing the mined information in a knowledge base. The method may also involve providing via the graphical user interface suggestions for options and factors for the assessment matrix of a data set, the suggestions derived from the mined information in the knowledge base based on at least one of a category associated with the decision, information in the data set, and participants associated with the data set.

The graphical user interface may allow users to dynamically explore relevant options and factors in a choicespace based on a decision category and relevant decision categories in the choicespace based on an option or factor and integrate such options and factors into the assessment matrix of a data set; may allow users to invite other users to participate in a decision using a data set, wherein each participant works in one or more perspectives of the assessment matrix of the data set; and/or may allow a user to cast a prefabricated data set for use by others, optionally but not necessarily including at least one perspective layer defined as unchangeable and undeletable by subsequent users. Such subsequent users of the prefabricated data set may be provided with updates made to the data set and the casting user may be provided with information about others' activities involving the data set.

The user-selectable views may also include slidebox views. At least one slidebox view may include, for each factor in a perspective, a single rating column in which all of the options have a conceptual 'lane' on which a sliding box signifies both ratings and scores, where the horizontal position of each box reflects the rating of an option on a factor, its width is proportionate to the normalized score corresponding to that rating, its height is proportionate to the weight assigned to the factor on the perspective, its depth is proportionate to the weight assigned to the perspective on the factor, the boxes can be moved along the lane to change a rating, and the boxes are automatically resized and repositioned as a user changes ratings and weights.

The user-selectable views may include value-volumetric views in which three-dimensional shapes are used to signify the relative volume of positive and negative value represented by specific options on specific factors in a perspective, and cumulatively for each option across all factors in a perspective. The user-selectable views may include views in which scores are expressed as value boxes that can be directly manipulated by users.

In various embodiments, options, factors, and perspectives may exist in composite form, with ratings drawn from those of elements that are defined as contributing to the composite element. The graphical user interface may allow users to expand and collapse composite elements to show and hide sub-elements that contribute to them.

The graphical user interface may allow users to manage collections of data sets in categories that involve simultaneous, interacting choices. The graphical user interface may allow a particular user working on a data set to search for other data sets that are available to the particular user and that are considered similar to the working data set, based upon search parameters or metrics that take into account categories and factor overlaps. The graphical user interface may allow users to create data set templates, virtual data sets, data sets that start out option-less but contain factors with customized scoring functions defining what a particular user would find acceptable and preferable, and master data sets to record an array of ratings across an array of options and factors for a plurality of related matters. The graphical user interface may allow users to entangle a plurality of data sets by making the overall rank of a common choice in one party's data set the rating of a factor in the data set of another party. The graphical user interface may allow users to sell data sets and portions of data sets.

The graphical user interface may accessible through a freestanding or stand-alone choice station located in a common area, the choice station allowing users to employ data sets as part of a decision-making process. Such a choice station typically would be connected to the internet or other network. Alternatively, the graphical user interface may run in a server and may be accessible from a user computer through a web-based interface.

In accordance with another aspect of the invention there is provided an apparatus and a system for supporting the making of a decision by one or more users, comprising a repository for storing one or more data sets, each data set including a three-dimensional assessment matrix characterizing one or more options for a decision in terms of one or more factors according to one or more perspectives, each perspective including a rating for each option for each factor and a scoring function for each factor; and a graphical user interface in communication with the repository, wherein the graphical user interface provides access to the repository to support interactive decision-making through user-selectable views of data sets including conceptual three-dimensional box views in which the options, factors, and perspectives of an assessment matrix are selectively mapped to the three dimensions of a box and also including conceptual two-dimensional slice views for individual options, factors, and perspectives of the box.

Embodiments of the present invention may also include an interactive tool/system/method for facilitating choices that organizes considerations in a three dimensional array defined by options, factors, and perspectives and computes comparative total scores/ranks based on ratings, scoring functions, and weights. Embodiments typically include a mechanism for presenting users with an interface through which they can rate options on one or more factors, with different perspectives separately expressible, review and revise scoring functions, and enter weights for both factors and perspectives. Embodiments may operate over a communication network or on a disconnected device. Data may be, but is not necessarily, presented in a three dimensional array.

Embodiments may also include a system in which choices are reified into objects/devices with complex data structures that persist and can be rendered in different views, such as, for example, a virtual box-like device that maps options, factors, and perspectives to three spatial dimensions, builds on an intuitive box metaphor to elucidate various aspects of choice-making, and can be manipulated by (1) adding and removing or hiding options, factors and perspectives; (2) filtering and sorting options, factors and perspectives; and (3) rotating the box and shuffling layers to view particular 'slices' of the overall decision in progress. Alternative rendering may include different "skins," perhaps using coloring or shading to highlight information or reflect ratings, scores, or other information.

Embodiments may have the ability to mix different methods for comparing options on factors within the same evaluative framework, by normalizing ratings to a commensurable scale.

Embodiments may have the ability to map perspective-specific scores to factor ranges that supports both nonlinear curves and dispositive points and ranges ("shoe-ins" and disqualifications), for purposes of computing scores.

Embodiments may calculate partial orderings from ordinally specified ratings and weights in order to spare users from having to enter unnecessary quantitative details.

Embodiments may include iterative approximation, with system providing guidance on where more specificity will resolve option ranking.

Embodiments may calculate and display the differentiating power of factors based on degree of variance in ratings of options on factors and factor weights.

Embodiments may rank and characterize options in terms of their relative betterness, computed from scores that in turn are computed from ratings via scoring functions.

Embodiments may support rendering of different views to multiple users and allow editing by multiple agents or processes, e.g., for collaborative deliberation. In such embodiments, each user may have editing rights with respect to zero or more perspectives, and each perspective may be editable by zero or more users. Such embodiments also may offer simultaneous multiuser techniques specific to choiceboxing by synchronizing and otherwise accommodating users working in a box in different sessions or views at the same time.

Embodiments may include mechanisms to initiate communications (e.g., email, audio, video, screen-sharing, or other forms of communication) from within a session, with people who are simultaneously in the box, who are in similar boxes, who supply options or rating information, or who have previously had or will prospectively have such a role.

Embodiments may gather objective and evaluative data from system usage, external data feeds, or by spidering the Web and analyzing texts and make the data available to users in context specific ways to support their entry and review of ratings.

Embodiments may dynamically update fields based on external data, including via mechanisms for suppliers of information and evaluative data to broadcast it to choosers with relevant boxes who subscribe or consent.

Embodiments may include a mechanism through which users can interactively explore options, factors, and categories, with a list of relevant candidates for each realm dynamically updated based on entries and selections in the other realms, such updates accomplished by automatic processes that draw on business rules and stored correlations of those realms.

Choiceboxing may be applied to procurement or Request for Proposal (RFP)/Request for Quotation (RFQ) processes by enabling a procuring entity to cast a box and invite bidders to submit on mutually invisible layers.

Embodiments may include physical "choice stations," e.g., kiosks or other automated devices, both stand-alone and networked, in retail, professional, and other settings at which people can start or resume choices. Bar codes (or URLs or GUIDs) may be included on box printouts for easy re-association with online boxes via bar code readers or other devices.

Choosers and choosees can be brought together for transactions that appear mutually desirable given the state of a box.

Information about consumer characteristics and preferences can be mined from choiceboxing activities and sold as market research or used for other purposes within choicespace (e.g., to interface with advertisers, sponsors, vendors, etc.).

Embodiments may also depict the assessment of options as two or three dimensional value boxes that can be individually considered and collectively totaled (e.g., choice as identification, sizing, and totaling of value boxes; goodness/betterness as tangible 'physical' quantity that can be gathered in discrete 'ingots' and combined into total quantities for given options from one or more perspectives, etc.).

Such value boxes may be presented for data entry/revision via direct manipulation (e.g., width sizing) in addition to display.

Information may be rendered in slideboxes, in which relative box positions express ratings (e.g., adding movement as well as sizing).

Probability information may be expressed via value box density, enabling a given volume to have more or less value significance depending on likelihood of the value being realized.

Embodiments may use social production techniques to gather choice support content, e.g., by providing bi-directional content exchange between usage sessions and an evolving knowledge base; tracking correlations of factors, options, and categories by noting co-occurrences within choice sessions; maintaining statistics about the weights accorded to factors and ratings given to options; collecting scoring curves and records of purchases and other decisions; collecting supporting information like useful resources (such as websites and publications), situation features, and tasks, and correlating it with factors, options, or categories; and providing folksonomies and thesauri through which users can share common meanings but also use their own preferred terms for options and factors.

Embodiments may build collections of reified choices and make them available to people based on characteristics of the choices or the people, e.g., the ability to explore neighboring boxes in choice space; a Wikipedia like collection—collaboratively editable choice space; communication within the community/space via box flags (e.g., "help wanted" or "willing to help with other decisions like this"); virtual boxes that are assembled just in time to reflect options, factors, and perspectives on a given topic based on information in multiple actual boxes; providing facilities through which people can buy and sell or otherwise exchange boxes and box components; and supporting prefabrication of a choicebox or box component intended for use by someone else.

Embodiments may enable parties to present context-specific links whose presence and contents can be scripted based on the state of a choice in progress, and through which users can choose to import structured information from the party and/or engage in conversations about the choice in progress, with or without surrendering their identities. Sponsor interfaces may allow for specifying how links are to be conditioned or constructed based on box parameters.

These and other aspects are discussed in greater detail below.

BRIEF DESCRIPTION OF THE DRAWINGS

The foregoing features of the invention will be more readily understood by reference to the following detailed description, taken with reference to the accompanying drawings, in which:

FIGS. 15 and 16 respectively show sample screens for "installed base" and "browser mode" factors.

FIG. 18 shows the perspective of FIG. 17 but showing scores rather than raw inputs.

FIGS. 19 and 20 respectively show sample screens for two additional perspective layers.

FIG. 21 shows a sample summary layer, with totals across the perspective layers of FIGS. 18-20.

FIG. 22 shows a variation of the sample summary layer of FIG. 21, showing votes instead of weighted totals.

FIG. 26 shows a sample factor slice including ratings on all options from all perspectives on that factor.

FIG. 27 shows a sample screen including the comparative weights assigned to factors across all perspectives.

FIG. 31 shows a choicebox represented in an optional discussion box format.

FIG. 32 shows a choicebox represented in the form of a grid with three-pane cells.

FIG. 33 shows a choicebox represented using value-volumetrics.

It should be noted that the foregoing figures and the elements depicted therein are not necessarily drawn to consistent scale or to any scale.

DETAILED DESCRIPTION OF SPECIFIC EMBODIMENTS

Embodiments of the present invention use a construct referred to herein as a "choicebox" to support choice-making within a conceptual choicespace. The choicebox allows the identification of one or more options, one or more factors, and one or more perspectives for a particular choice. Each choice is associated with one or more categories. The options, factors, and perspectives are logically mapped to imagined x, y, and z axes and can be envisioned and graphically represented as a three-dimensional assessment matrix or box. Within the context of the present invention, choiceboxing is the activity of deliberating about a choice using a choicebox. Choiceboxes are built and manipulated using software that renders their data into visual and interactive form. They serve as shareable places for collaborative deliberation.

Figure 38:
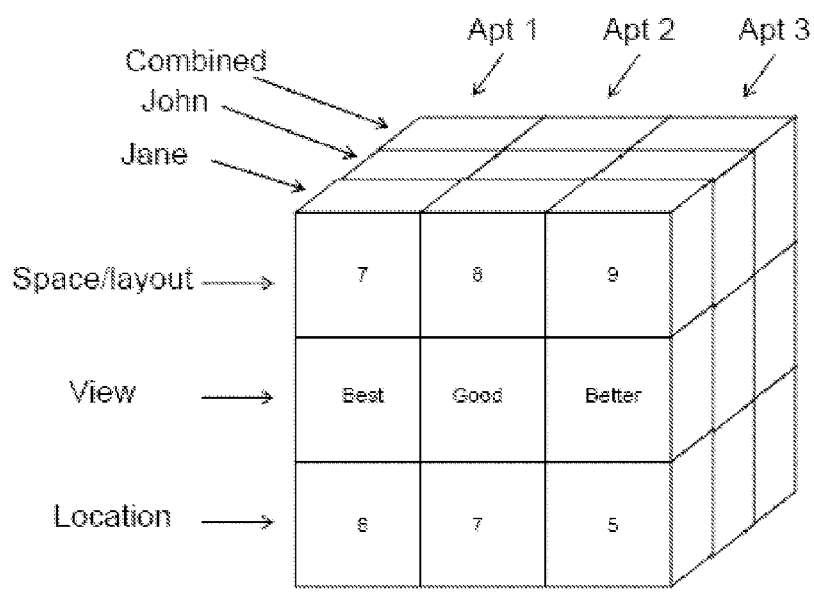
FIG. 38 shows a graphical representation of a conceptual choicebox.

One advantage of the choicebox construct is that it facilitates representation, visualization, and manipulation of the options, factors, and perspectives (including ratings, scores, and other information) via a graphical user interface. FIG. 38 shows a graphical representation of a conceptual choicebox in accordance with an exemplary embodiment of the present invention. Here, the options are arranged along the x-axis, the factors are arranged along the y-axis, and the perspectives are arranged along the z-axis. This choicebox might be used for choosing an apartment and includes columns for three possible apartments (Apt 1, Apt 2, Apt 3), rows for three factors (Space/layout, View, Location) on which the apartments can be rated, and three perspective layers (Jane, John, and Combined). The perspective layer for Jane is at the forefront and includes nine cells, specifically at the intersections of the three option columns and three factor rows. The perspective layer for Jane is shown with ratings/scores in all nine cells. The perspective layer for John would similarly include nine cells in which John could provide ratings and scores could be computed. The Combined perspective layer is a summary layer that includes a combination of the ratings/scores from the Jane and John perspective layers (e.g., the sum or average of scores for the corresponding cells). For convenience, total score rows are omitted from perspective layers shown in FIG. 38.

Choiceboxes may have a resource pane displayed along with them, containing links to relevant resources, e.g., external web sites and content internal to the choicespace. Links can also represent proffered options, factors, or perspectives that someone want to make available, and that can be previewed and adopted if desired by an authorized user in a box.

The following terminology provides a general framework for describing various aspects and embodiments of the present invention. Unless the context otherwise requires, embodiments of the present invention are not limited to or by such terminology.

Choices and Options

Choice making is a particular form of decision making, involving selections from groups of discrete alternatives. Each such possible choice is referred to herein as an option (e.g., "What are my options?"). The term choice refers to the overall decision involved or the particular option(s) ultimately chosen, and "options" for the things among which one chooses.

Related terms for individual options include candidate and alternative.

Some choices involve picking a single best option from a group; others involve picking several, or even ordering an entire set from most preferred to least. Embodiments of the present invention are not limited to any particular type of choice.

Categories

A given choice generally involves options that share certain kinds of characteristics, making it possible to compare them in terms of common factors. Those characteristics define one or more categories of things within which one is choosing. For example, the category might be "digital camcorders," "possible birthday presents for Jane," or "rental apartments in downtown Chicago."

While every set of options can be seen as belonging to a large set of increasingly specific categories (electronic devices|video recorders|camcorders|digital camcorders), there are generally one or more categories that best describe the set being considered.

By categorizing their choice in a standardized way, people can more easily access options, factors, and other information identified by others as worth considering in such a choice.

Factors

While a wide variety of techniques and approaches are used to make choices, they usually involve the consideration of multiple factors in terms of which the candidates differ. Factors are abstract qualities or characteristics in terms of which options may be described and compared. For example, they may be answers to questions like "what makes a good _____?" and "what makes a bad _____?" Thus, a factor is essentially a kind of feature or kind of difference that a person cares about.

Related terms include: consideration, criterion, dimension, feature, property, objective, goal, differentiator, care, risk/benefit, pro/con, concern.

Note that there are typically other facts involved in a choice that do not themselves differentiate options, but that can be critical in assessing which factors to consider and how to rate options on them. These include characteristics of the person whose interests are being taken into account, and of the world more generally. See Facts and Assumptions below.

Factors can be mapped to categories at various levels of generality. For example, price is a highly general factor that generally will be considered in most choices, while proximity to Millennium Park is a factor unlikely to be relevant outside of a Chicago real estate context.

Factors often have differential weights in a particular choice—the relative degree of importance or significance attached to each by each perspective being considered in connection with a decision.

Weighted factor analysis is one common method for systematically comparing options in a choice situation. Each option is rated with respect to each factor, each rating is turned into a normalized score, and the weighted total of scores across all factors is used to reflect its relative overall "goodness."

Ratings, Scores, and Perspectives

A rating is the information entered with respect to a given factor for a given option in a given perspective.

This term is most apt for factors that are quantifiably evaluable or that involve some judgment or opinion, but in the absence of a better general term for "what there is to say about this option in terms of this factor," it is used here generically. Related terms include assessment, entry, input, and cell content.

There can be more than one perspective afoot in a given choice category. A sole decision maker may himself or herself have more than one way of looking at the options and factors, and each member of a deciding group will typically have at least one of his or her own. Helpers may have perspectives that vary in at least some respects from the decision maker(s). There can also be perspectives of candidates, suppliers, or other "choosees."

Perspectives are distinct informational or evaluative takes on a choice. They capture different voices and viewpoints, for instance, from different people or from different places or times.

Each perspective can have an independent set of scoring functions or weights for the various factors, and its own weight(s) relative to other perspectives (potentially differing by factor). In other words, each factor has a weight in each perspective, and each perspective has a weight for each factor. The latter ability (to weight a perspective differently by factor) can be used e.g., to reflect expertise in a certain aspect of a decision, or a given user's entitlement to disproportionate impact on such an aspect.

Perspectives can also vary in terms of the scoring functions they assign to the range of possible ratings for each factor. Equivalence functions can be used to convert between units in which different factors score options.

Thus, options are assigned scores for each rating they have been given on each factor in each perspective by applying the scoring function associated with that factor in that perspective. A scoring function that uniquely assigns scores to all permissible ratings on a factor is required to be in place in all perspectives for factors that are in the assessment matrix. A default function for each factor may be specified for a box, and different functions may be specified for particular perspectives.

An overall score is computed for each option with respect to a perspective by combining the individual factor scores according to a totaling function, e.g., by taking the weighted average of scores for all options on the factors present, using the factor weights given for that perspective (i.e., adding all the scores for the option on the perspective multiplied by the weights of the corresponding factor on the perspective, and dividing the sum by the sum of the weights). In an exemplary embodiment, factors that have no specified rating on the perspective for the option are ignored, although an alternative embodiment may allow such factors to be included in the total score (e.g., by treating them as though a default rating had been specified).

A perspective can have other attributes, such as whether its owner has designated it as "finished" or not, i.e., whether he or she has entered all ratings he or she intends to enter and is prepared to have them treated as final for the sake of the decision in progress.

Access to the various perspectives may be controlled through a set of permissions. For example, an "owner" of the choicebox may be able to view all perspectives as well as a summary combination of all perspectives, whereas each individual contributor may be restricted to only his or her own perspective. In this way, for example, the system may support such things as competitive bidding, adversarial multi-party negotiations, and other situations in which it is necessary or desirable for contributors' identities and/or inputs to be hidden from one another. Thus, for example, choiceboxes may be applied to RFP and other procurement processes, which may involve, for example, a procuring entity casting a choicebox and inviting bidders to submit mutually invisible perspectives/layers. The "owner" may be permitted to select how the various perspectives are displayed, e.g., each contributor can see only his or her own perspective, or each contributor can see representations of the other perspectives with the identities and/or the inputs hidden.

In typical embodiments, users may be permitted to select which perspective(s) to include in a decision, either explicitly (e.g., by highlighting the perspectives to be included or hiding the perspectives to be excluded) or by adjusting the weights applied the various perspective (e.g., a perspective to be excluded may be assigned a weight of zero). Inclusion of a particular perspective in a decision may be contingent, for example, including the particular perspective if and only if there is a tie.

When a number of perspectives are included in a decision, as discussed below, the system may limit each contributor to a single perspective so that, for example, one contributor cannot skew the decision by having multiple perspectives included in the decision.

Kinds of Factors

Factors can be organized into four basic kinds based on
whether they are 'subjective' (i.e., whether ratings on the factor can be a matter of opinion and vary across perspectives for a given choice) or 'objective' (i.e., ratings are considered a matter of fact); and
whether they are quantifiably evaluative (i.e., whether their ratings can "count" and contribute to an overall score) or are merely informational The following are some examples:

|  | Evaluative (comparative, quantifiable or rank specifying; scalar; contributes to overall score) | Informational (descriptive; doesn't contribute to total score in current box) |
| --- | --- | --- |
| Objective (perspective invariant, at least for purposes of the current choice) | price most "features" number of pixels number of employees installed base years in business | supplier name supplier website quotes, links, reviews |
| Subjective (matter of opinion; can vary by perspective) | likeability competence quality of experience ease of use | notes, observations other factors deemed irrelevant or inappropriate for affecting score |

Whether to treat a factor as objective/subjective, or evaluative/informational, sometimes is a matter of judgment for the deciding group.

Properties of Factors

Each factor has a definition that describes its basic properties, including the range of rating entries a user can make with respect to options and the default significance of such entries.

The following questions are typically involved in defining a factor:
whether it is 'subjective' (i.e., whether ratings on the factor can be a matter of opinion and vary across perspectives for the present box) or 'objective' (ratings are considered a matter of fact)
whether it is quantifiably evaluative (i.e., whether its ratings can be given a score) or are merely informational
If only informational,
are entries free text, numbers, URLs, pictures, or some other particular data type?
are there any limits on length or permitted characters?
If evaluative,
is it cardinal (arbitrary number or quantity), ordinal (first, second, . . . ), binary, or multi-choice? (Cardinals can be understood as quantitative or continuous factors, and all other types as discrete factors, with lists of possible selections.)
what score is associated by default with each possible rating for individual perspectives?
does any given rating constitute an instant win or disqualification by default for individual perspectives?
If an instant win or disqualification is possible, which possible ratings trigger such results by default for individual perspectives?
If cardinal,
units in which ratings are made (dollars, minutes, miles, ounces, megapixels,
range constraints—is there any maximum and/or minimum permissible value; are there impermissible sub-ranges?
If binary or multi-choice
what are the options? (binary defaulted to yes/no)

For evaluative factors, a default scoring function may be established. This involves specifying a score—in some unit or currency that has been designated as the standard, or that is convertible to such a standard—for each possible rating that might be given. The units in which an option may be measured on a factor will typically be different from the units in which its utility (value, worth) on that factor is measured. The former are typically things like dollars, miles, and minutes; the latter are typically things like degree or percentage of satisfaction, or arbitrary units of goodness one might call "hedons." In order to fairly compare and combine ratings across different factors, and across different perspectives—in order for them to be commensurable—they are typically normalized to a common scale. For example, the price of items may range from $300 to $3000, and their ease of use may be judged on a scale of 1 to 5. By expressing scores on a standard scale—or one that can be automatically converted to such a scale—ratings can be said to be normalized for meaningful combinations into overall scores.

Figure 35:
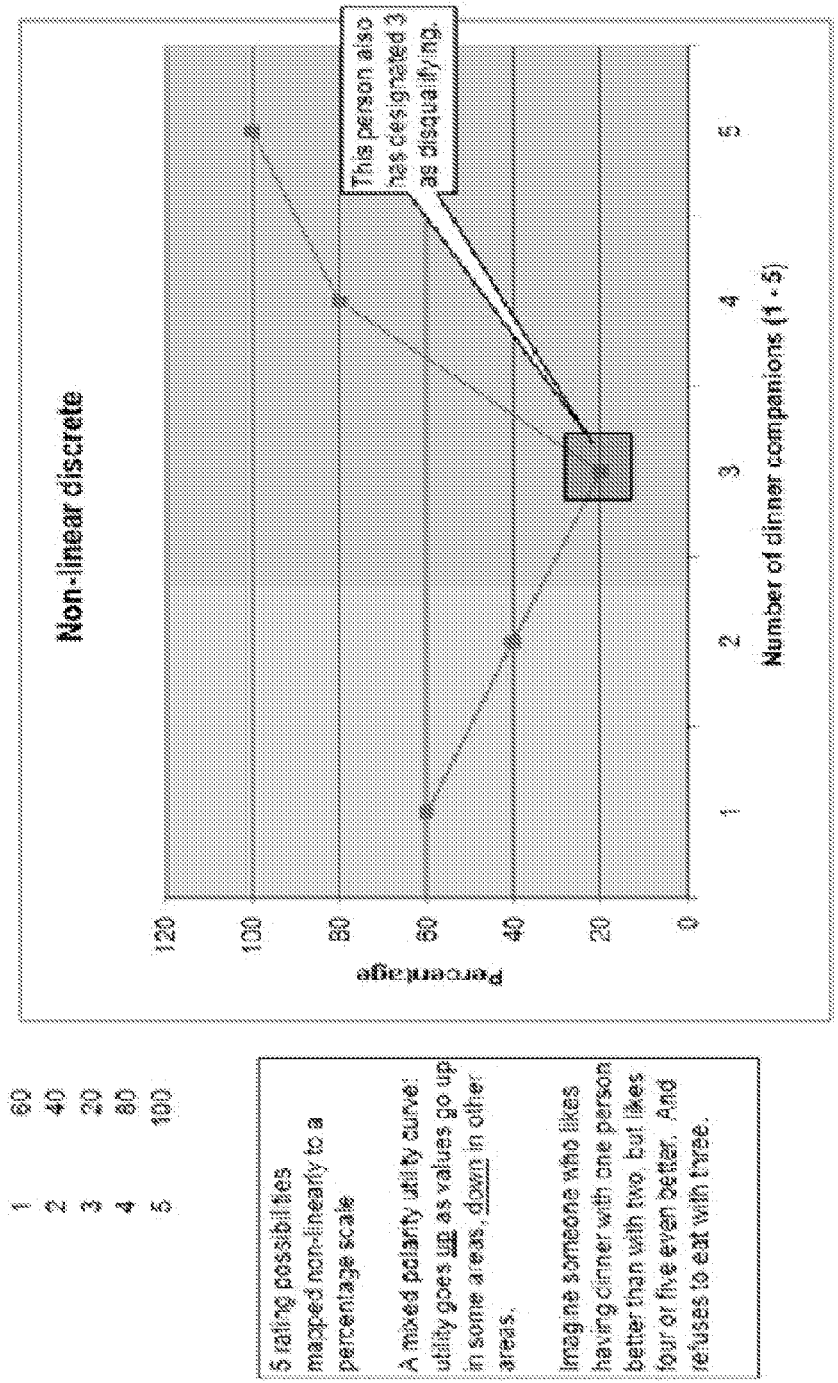
FIG. 35 shows a representation of an exemplary non-linear scoring function.

The scores that correspond to each point in the range of permissible ratings may be communicated by drawing or otherwise expressing the two-dimensional curve (or point set) that expresses that relationship. Scoring functions may be linear or non-linear. Scoring functions may be increasing (e.g., higher ratings result in higher scores), may be decreasing (e.g., higher ratings result in lower scores), or may have both increasing and decreasing ranges. An illustrative non-linear scoring function having both increasing and decreasing ranges is show in FIG. 35. Other examples of non-linear scoring functions having both increasing and decreasing ranges include scoring functions with bell- or U-shaped curves. It should be noted that a scoring function may map some or all ratings to negative values, where a negative score typically would be subtracted from the total rather than added to the total.

A similar form of normalization may need to be done to entire perspectives to avoid having their contributions depend upon whether the associated user tends to rate or weight especially low or high, leaving any differences in impact to explicit perspective/factor weights.

In exemplary embodiments, aspects of a factor's default scoring function can be overridden for a given perspective, as can be the equivalence curves expressing the relative value of units in terms of which the utility of factors are measured.

A percentage approach is described in the following table as an example.

| factor type | presentation | Scoring |
| --- | --- | --- |
| Informational | free form data entry | no score, or effect on total |
| cardinal | space to enter any number (at or above a minimum if given and up to maximum if given) | percentage of highest rating for the factor, or of maximum if given, minus minimum if given |
| ordinal | space to enter a positive integer; gaps and ties permitted | 100 minus ((rank − 1) * 100/number of options) thus e.g. 100% for first, 80% for third in a 10-option choice |
| binary | checkbox | percentage as specified for the selection in factor definition |
| multi-choice | drop down list | percentage as specified for the selection in factor definition |

Differentiating Power

Within each perspective in a choice category, each factor also has a computable degree of differentiating power. The differentiating power of a factor is a measure of the degree to which the ratings on that factor contribute to the overall score differences among the options. For any perspective, it is generally equal to the sum of all pair-wise score differences between options in the set being considered, times the weight of the factor. Similar amounts can be computed for factors for the box as a whole by taking into account perspective/factor weights. For example, in multi-perspective boxes, the differentiating power of a factor is generally the average of its power across all the individual perspectives, weighted by perspective weights for that factor.

Composite Elements and Sub-Elements

Options, factors, and perspectives can exist in simple or composite form. When a composite element is present in an assessment matrix, its associated ratings draw their values from those of elements that are defined as contributing to the composite element. A composite element can be defined as having another composite element contribute to it. Elements can contribute to more than one composite element. And the relative contributions of elements to a composite element can be specified by weights.

A composite option for example can be one that represents a package of simple options that are separately present in a box. It can be a predefined package, or the package of all options that are presently indicated as being provisionally selected. As ratings are given for the simple options that contribute to it, ratings for the package as a whole can be computed, as can be its overall score. Some ratings can be calculated as a simple sum, for instance, of the prices of the included options. Methods for combining ratings of other types can be defined, such as displaying Yes for a required feature when at least one of the included options has it.

A composite factor can be a higher level characteristic that summarizes more specific ones. For example, a Vendor Stability factor might be defined as a composite, based on simple factors like Current Market Share and Financial Outlook.

A composite perspective for example can be one that summarizes a set of ordinary perspectives in a box. (The summary layer available in some views reflects such a perspective for all simple perspectives in a box.) It can also be one that summarizes perspectives in other boxes, such as the averaged weights and ratings across a choicespace on options and factors present in the box being viewed, or just those in boxes that share common characteristics, such as the age range or gender of the beneficiary.

Users may be given the ability to expand and collapse composite elements, showing and hiding sub-elements that contribute to them.

Ordinal Mode

In qualitative or ordinal choiceboxing, comparisons among options and relative factor and perspective weights may be selectively expressed in non-quantitative terms, with all factors defined to use an ordinal rating method. In an ordinal mode, options are ranked in order of goodness on the factor, e.g., with a rating of 1 being the best (other rating schemes are possible). Ties and gaps typically are permitted. Weights of factors and perspectives are similarly elicited. A standard scoring function for ordinal factors is applied, such as, for example:

$$100 \text{ minus } ((rank-1)*(100/\text{number of different rankings}))$$

Thus a set of options with ranks of 3, 1, 4, 4, 3, 2 on a given factor might have scores of 50, 100, 25, 25, 50, 75, respectively, for that factor.

Weights that are elicited in ordinal terms are similarly calculated (e.g., using 10, for instance, in place of 100), to ensure that the factors or perspectives ranked "high" (with a low number) have an appropriately high weight.

Relative ratings and weightings can be elicited by users either entering ordinal numbers or by dragging icons representing options, factors, and perspectives into relative positions in a graphical view.

Ordinal mode can be useful for an individual or group to quickly size up the relative overall value of options, and identify areas of further research and discussion. Ordinal ratings and weights are sometimes sufficient to identify options that are so inferior that they can be rejected without further analysis. When an option can be established as better than another on at least one factor, and at least as good on all other factors being considered, it can be regarded as categorically superior, without regard to quantitative differences. If the number of such options is equal to the number needed to be chosen, no further analysis is necessary so long as no further options, factors, or perspectives are introduced into active consideration.

Ordinal ratings and weights can also focus attention on particular areas where more quantitative specification is needed, at which point certain factors can be defined with cardinal or other rating methods, more precise ratings entered, and scoring functions adjusted as seems appropriate. Weights that have been calculated from ordinal inputs are generally sufficiently precise and require no adjustment.

Dispositive Ratings—Instant Wins and Disqualifications

In addition to the raw rating and normalized score a given option can have on a given factor for a given perspective, the option can be determined to be an "instant win," or alternatively, to be disqualified, based on the rating. Whether or not a certain rating causes either result may be a perspective-overrideable part of the factor definition. Factors with respect to which ratings can be dispositive tend to be the most important in a decision, although they often are applied to wean out candidates before a choice is even framed and thus may not be explicitly in the box.

An instant win occurs when an option is rated in such a way on one factor that its ratings on other factors do not matter. It is generally possible for multiple options to end up as winners.

A disqualification happens when an option has so unacceptable a rating on some factor (for instance, a failure to meet a must-have requirement) that it cannot be counterbalanced by even the highest ratings on other factors.

Ratings and ranges that do not involve any disqualification represent a zone of acceptability.

Since instant wins and disqualifications can be perspective-specific, by virtue of such a definition and a particular rating, an option can be dispositively chosen or disqualified on one perspective when not on others.

Goodness, Badness, and Betterness

The relative desirability or undesirability of options on given factors can be understood as quantities that can be combined when factors have been defined with scoring functions described above.

An alternative to absolute goodness or badness of an option on a factor is to compute the comparative goodness/badness of options to other options rated on the same factor. For any factor on any perspective, each option is regarded as having a quantity of betterness equal to the amount by which its goodness exceeds that of the lowest scored option on the factor. (The lowest scored option thus will have zero betterness.) Betterness quantities, like goodness, can be totaled, and overall betterness used as a gauge of which options are superior, all present factors considered.

One benefit of a betterness approach is that all values are positive (or zero). This focuses attention on the relative attractiveness of options on factors explicitly considered, without implying some overall total cost of ownership or ROI analysis, which absolute positives and negatives tend to do.

Facts and Assumptions

As noted above, there are typically many facts involved in a choice that do not themselves differentiate options (and thus aren't considered factors), but that can be critical in assessing which factors to consider, how to rate options on them, and other tasks involved in a choice. These include statements about persons involved in a choice (e.g., the persons making the choice and/or the persons whose interests are being taken into account), their goals or circumstances, and of the world more generally. One can also think of them as situation features.

Facts have properties such as the following
      Whether it is unknown (and thus is an issue or question), known, or assumed.
      Who is asserting or asking about the fact
      What kind of fact it is, such as circumstance or purpose.
      If known or assumed, the degree of confidence the asserter has in it
      Particular ratings, weights, and scoring functions can be indicated as dependent on a fact or assumption by a tag or other means.

For example, in choosing among possible treatments for prostate cancer, whether or not the cancer has spread beyond the 'capsule' and how close the nearest hospital is can be significant in assessing the relative likelihood of a cure and the convenience of treatment. Even when facts can't be known with certainty, it is important for those involved in a decision to articulate and document their assumptions.

Assumptions and questions can vary by perspective.

Features or facts that are thought to be important but are not yet known represent issues or questions.

Roles

Each choice situation generally has at least one chooser—the person or persons making the decision. Often, one or more options are associated with a supplier or "choosee"—the person or entity that constitutes or provides that option. And sometimes there are one or more helpers or advisers—people who assist the chooser with information and advice.

There is also sometimes a separate role of the person, group, or entity whose interests are being taken into account for purposes of assessing comparative value. Such a beneficiary (or "defined interest") may not even play any role in the actual decision. (E.g., in deciding on a course of medical treatment for a young child, or someone in a coma.) It answers the question "what's best for who?" (In a purchase decision, it answers the question "Who are you buying for?") For effective choices, there should be clarity about whose interests are sought to be served. Each perspective should correspond to one answer to that question, and usually all perspectives share the same answer. In other words, most boxes involve the interests of a single beneficiary.

Note that sometimes there are choosers involved who do not directly use the system (perhaps due to disability or disinclination to use a computer), but instead operate via another user. Such choosers may be referred to as vicarious users.

Conversely, while many choices involve decisions faced by human actors, some aspects of choicemaking and associated tools can apply to intelligent agents and other artificial actors. For example, a choicebox for deciding whether/when to purchase or sell a stock may include perspectives populated by an investment advisor, a stock broker, and a computerized agent. Similarly, choiceboxes may be used to arbitrate between human and non-human actors or even between multiple non-human actors.

When multiple choosers are involved in a decision, it often makes sense to designate one as the choice manager, a role with which special administrative powers and responsibilities can be associated.

Tasks

A task is something someone may be advised to do that relates to a choice. Its properties generally include such things as:
   Name or label
   Description
   Type—action or decision
   Status (done, to be done, declined)
   States of the box or its contents that make the task recommendable Choiceboxes can have dynamic checklists of things to do or consider.

Resources

A resource is a publication, person, group, or other object that someone describes in a choicebox as relevant or useful to the choice at hand. Its properties typically include such things as:
   Name or label
   Description
   URL or other identifier
   If specific to particular factors or options, which if any factors or options the resource specifically relates to.

States of the box or its contents that make the resource relevant

Choiceboxing and Choicespace

A choicespace is a environment in which choices may be deliberated using choiceboxes. Choiceboxes may be stored in box repositories (e.g., operated by CSPs—choice service providers) such as web sites that manage box storage and sharing. Such sites may also mediate access to knowledge bases of copyable boxes and parts, process guidance, category graphs and correlations, choices, factors, and ratings. A CSP can draw upon its boxes in privacy-honoring ways to build its knowledge bases and mediate voluntary interactions among its users and sponsors. It can also manage category-independent preference profiles that users can access in framing their choices, and attach reputations in reference to which other users can decide how to interact.

Figure 44:
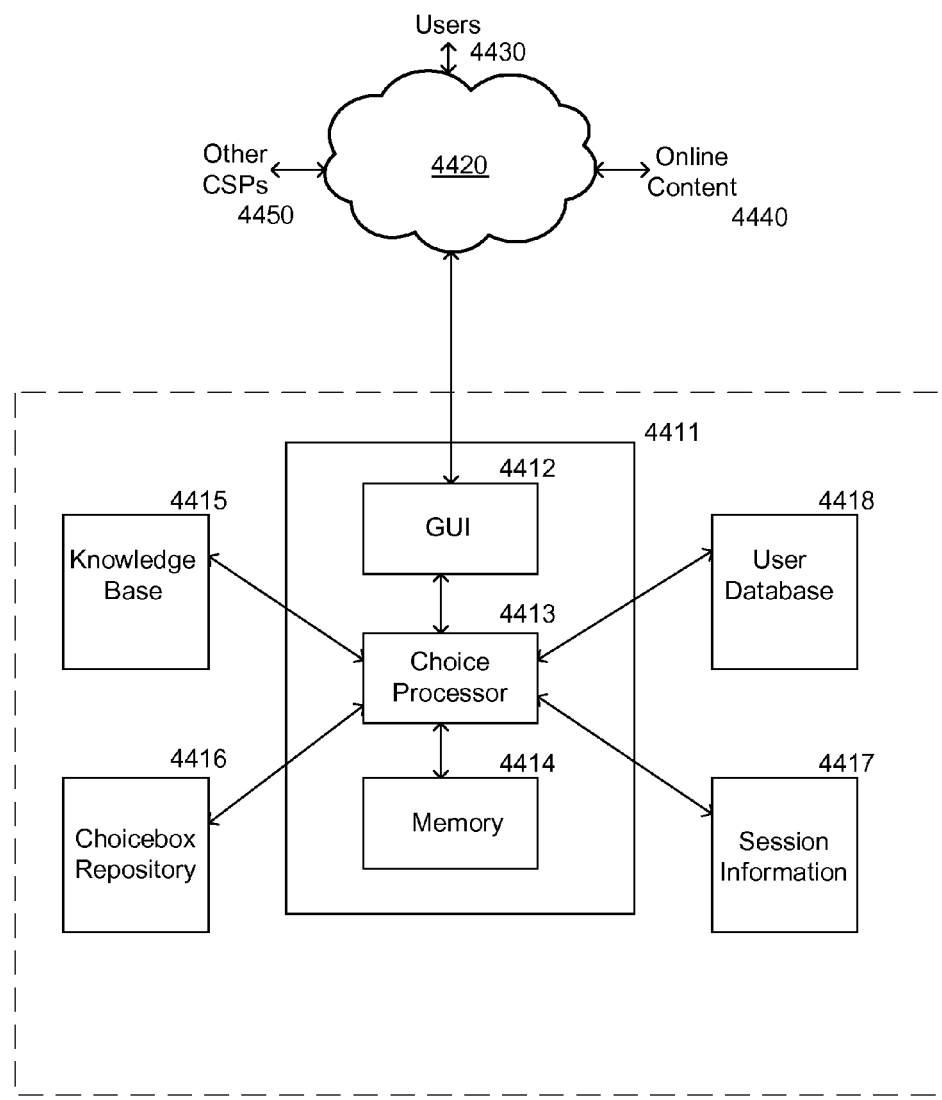
FIG. 44 is a schematic representation of an exemplary choiceboxing system.

FIG. 44 is a schematic representation of a choiceboxing system in accordance with an exemplary embodiment of the present invention. Among other things, the choicespace includes a CSP system 4410 in communication with various users 4430, online content providers 4440, and other CSPs 4450 via a communication network 4420 such as the Internet. The CSP system 4410 includes a choice server 4411 that includes, among other things, a graphical user interface (GUI) 4412, a specially-programmed choice processor 4413, a memory 4414. The CSP system 4410, and specifically the choice processor 4413, also maintains a knowledge base 4415, a choicebox repository 4416, a user database 4418, and session information 4417.

Typically, much of the choiceboxing functionality is controlled by the choice server 4411 over the communication network 4420, for example, through an interactive web-based interface in which screens are provided to the users for collecting information, displaying information, and allowing the users to manipulate information. Such embodiments typically would not require any special-purpose software running on the user computers but instead typically would require only a web browser perhaps with some standard plug-ins.

Embodiments may additionally allow for choiceboxes and related information to be exported to client devices for use online or offline. In such embodiments, special-purpose client software may be provided to the user computers. This client software may allow essentially read-only-type functionality (e.g., allowing the user to display a choicebox in various formats and also allow for some minor manipulation, such as the ability to hide perspectives and change the user's ratings, weights, and other inputs) or may allow more full-featured functionality (e.g., allowing the user to add options and factors and synchronizing the changes with the choice server 4411 at appropriate times).

Objects in a choicespace typically include such things as:
Actors
Categories
Options
Factors
Perspectives
Choiceboxes
Facts
Tasks
Resources
Knowledge Base All objects in a choicespace typically have an identifier that is globally unique to the space (GUID).

A choicebox is a structured collection of objects, including such things as:
Actors
Options
Factors
Perspectives
Assessment Matrix
Facts
Tasks
Resources
Tags/Comments Actors, options, factors, perspectives, facts, tasks, and resources primarily operate inside choiceboxes but some or all may also have a box-independent identity in choicespace.

For example, choicespace users are typically tracked globally (e.g., subscribers to the CSP) as well as on a per-box basis (e.g., which users are associated with a particular choicebox, and which choiceboxes are associated with a particular user). The following types of information are generally maintained globally for choicespace users:
name
account name and password
whether they are a natural person or a group or entity (on behalf of which some natural person acts)
one or more type
  box user
  box or box part supplier
  assessment supplier (e.g. an independent resource like Consumer Reports)
  choice analyst (a person who develops box content or source material for the CSP or independently)
  boxcaster
  sponsor
  choice service provider
Permissions with respect to seeing, adding, deleting, and changing objects in the choicespace
A preference profile, possibly with category-based variations
A reputation, possibly with category-based variations
Demographic or psychographic characteristics, volunteered or inferred Similarly, categories are typically tracked globally (e.g., a list of choice subjects from which users can choose) as well as on a per-box basis (e.g., the category or categories associated with a particular choicebox). The following types of information are generally maintained globally for categories in a choicespace:
GUID
Name
Description Factors, options, perspectives, facts, tasks, and resources also may be tracked globally and on a per-box basis, for example, to allow for portability of such elements within choicespace (e.g., a factor in one category may become associated with another category, a perspective in one choicebox may be copied or moved to another choicebox, etc.).

Choicebox Information

The following types of information are generally maintained as a data set for each choicebox in a choicespace:
  its category/ies—the kind(s) of options involved
  its beneficiary (the person or entity whose interests are understood as being considered in making ratings, weighting factors, and specifying scoring functions, absent a different designated beneficiary for a particular perspective)
  its maximand—the measure of value in terms of which options are scored; the top level goal being pursued or theory of the good—which defines the standard unit in terms of which scores and totals are expressed
  its history (all changes)

whether it represents an actual choice, a model one, or a virtual one whether it is for a select-one-option or select-multiple-options choice whether the box is 'open' or 'closed' (that is, whether the choice involved is pending or has been made)

participant permissions with respect to seeing, adding, and changing contents of the box or permissions of participants preference settings for participants its visibility to non-participants, and if so, how it should be characterized (e.g., "help wanted" or "willing to help with other decisions like this.")

whether it can be copied (Saved-as) by participants and/or others with viewing rights relationships to other boxes (with types and links to them)

a definition that specifies what if any value or expression should display along with overall scores, e.g., the score itself, the ordinal ranking, and/or other terms like 'good,' 'better,' or 'best.' The latter can be thought of as an inverse utility function, mapping from scores to a range of terms.

miscellaneous questions/issues, tasks, notes, resources, staging areas for imported material that has yet to be integrated options, factors, etc. that a user has decided not to actively consider Options, factors, and perspectives may be referred to collectively as structural elements. Options, factors, or perspectives typically have properties with respect to a box such as:

a name and description a GUID within the box the GUID of the standard corresponding element in choicespace, if any Whether or not they are included in the box's assessment matrix Whether their properties are controlled by box participants or drawn from a source external to the box If drawn from an external source, whether copied or dynamically referenced Options within a box have properties such as selection status (not selected, tentatively selected, selected, rejected) Factors within a box have properties such as whether they are 'subjective' (i.e., whether ratings on the factor can be a matter of opinion and vary across perspectives for the present box) or 'objective,' (ratings are considered a matter of fact)

whether they are quantifiably evaluative (i.e., whether their ratings can "count" and contribute to an overall score) or are merely informational Perspectives within a box have properties such as Owner(s)—user(s) who are authorized to enter and change weights, ratings, and scoring functions for the perspective Source—the person, entity, or group that is understood to be 'speaking'

Beneficiary (if different from box default)

Whether the perspective content is not yet started, in progress, provisionally finished, or closed Scoring functions for each factor in the assessment matrix (when different from box default)

Weights for each factor in the box

Weights for the perspective on each factor

When a choicebox has at least one option, factor, and perspective under active consideration, an assessment matrix is defined at the cells of which values can be specified. It is one dimensional until more than one structural element has more than one occurrence under consideration, two dimensional when two elements have more than one occurrence under consideration, and three dimensional when all three elements have more than one occurrence under consideration.

Each unique combination of an option, factor, and perspective defines an assessment cell, representing the characterization (opinion or alleged fact) of some option in terms of some factor according to some perspective.

Each cell generally has properties such as:

The GUIDs of the option, factor, and perspective combination it uniquely represents Current rating, if any Source—user entered, computed, cloned from elsewhere in the box, or supplied from outside the box If externally supplied, static copy or dynamic reference?

Identity of the user or process that supplied the current value

Date/time current value supplied

A cell's data type is that of the factor associated with it (which may change over the life of a cell if a factor is redefined).

A history of prior values is optionally stored for cells, each time and person stamped.

Subboxes or "box parts" may include such things as:

individual cells, rows, columns, sticks, or slices sets of cells, rows, columns, sticks, or slices (contiguous or discontiguous)

Each choicebox has one or more participants or users. Each user has one or more roles. At least one should be the owner. Others can be fellow owners, choosers, helpers (including friends and family), or suppliers (choosees), with permissions to see and do things controlled by the owner(s). (But note that even owners may not have complete rights to do everything in boxes that have been spawned from ones that have been 'boxcast'. See below.)

Each user can be assigned as the owner of zero or more perspectives. Users and perspectives can stand in many-to-many relationships.

Boxes can change ownership—one person can start, and give to another.

Participants in a choicebox typically have properties such as

A actor GUID in choicespace

One or more of the following roles box owner chooser supplier or potential "choosee"

helper or adviser beneficiary box manager

Whether currently in a session involving the box

When last in the box (date of last visit)

As discussed above, in exemplary embodiments of the present invention, options, factors, and perspectives associated with a choicebox are logically mapped to imagined x, y, and z axes and can be envisioned and graphically represented as a three-dimensional assessment matrix or box. For example, the option, factor, and perspective dimensions may be logically mapped using a column for each option, a row for each factor, and a layer for each perspective, although these dimensions could be mapped differently. Alternative embodiments may permit users to swap axes, e.g., so that options are rows and factors columns, although a standard mapping tends to promote usability. Each cell at the intersection of such a column, row, and layer represents the characterization of some option in terms of some factor according to some perspective. Typically, this characterization includes a rating provided by a user, and the rating is converted into a normalized score based on a scoring function. There also may be columns or rows for factor and perspective weights.

Columns, rows, and perspectives can be also be used to represent packages of elements, such as a set of selected options, as discussed above with respect to composite and sub-elements. In an exemplary embodiment, values in such "virtual" rows, columns, or layers are generally computed ones.

Each perspective layer typically has a total score row showing a total score for each option based on a totaling function, e.g., a parameterized totaling function such as the weighted average of scores for each option on the factors present. In an exemplary embodiment, unanswered cells are ignored in computing totals, not treated as zeroes; if a user wants to express a rating of zero at an option/factor/perspective intersection, it should be affirmatively entered. Whether empty means "haven't yet gotten to this" or "no opinion" can be clarified by a tag. Factors weights typically are not permitted to be "empty," e.g., factors are typically associated with default weights that can be changed but not deleted.

When there are multiple perspectives present in a box, a summary layer is available to show composite scores for each option and composite weights for each factor, from across the perspectives. The summary layer may be stored as part of the choicebox or may be dynamically computed and displayed. In an exemplary embodiment, composite scores for each option are computed generally as follows:

For each rating (of the option on a particular factor in a particular perspective) that has a value, multiply the score associated with that value times its factor weight in that perspective, and multiply the result times the weight of the perspective on that factor.

For each factor that has a rating on at least one perspective, add up the above doubly weighted scores from all such perspectives, and divide the result by the sum of the factor weights for that factor times the sum of the perspective weights of all such perspectives on that factor.

The composite score for each option is the sum of the doubly weighted averages computed as above for each of the factors divided by the number of factors on which at least one perspective had a rating for the option.

Totaling algorithms more complex than weighted averaging can alternatively be used, e.g., ones in which certain factors have multiplicative impact on totals, or inter-factor relationships are taken into account. Weights can be seen as a very basic form of parameterized totaling function—$ax+by+cz$ . . . Layers can also be used to summarize differences between perspectives, or majority and minority (dissenting) viewpoints. A difference layer for instance can show the range and standard deviation within each rating cell across all perspectives. A layer can also be used to display the average of what others in a choicespace think about the options on the factors being considered.

Within a choicebox, users can do such things as:
enter and reorder as many options, factors, and perspectives as they like
rate each option in terms of each factor
view and manipulate the resulting box in any 'slice'
see weighted total scores for all options on each perspective, and across all perspectives
leave cells unanswered or empty and have them be neutral with respect to computed totals
see reports that
  summarize the current state of their choice in plain language
  summarize boxes in two- and three-dimensional charts and graphs (such as histograms and scatter diagrams)
  summarize boxes in quick pros & cons lists (for each option, list of what factors it's better on than all/most other options; which worse)
show the automatically computed differentiating power for each factor
perform difference analysis (identify which perspectives are most alike and most different—both in a box as a whole and on particular options or factors; ditto for which options are rated most similar/dissimilar within and across perspectives)
perform sensitivity analysis (which rating and weighting changes would make the most difference in overall rankings? how much a given weight or rating would need to change to make a difference in the outcome)
show statistical results (such as standard deviations across options and perspectives) and diagrams (such as box and whiskers)
annotate any option, factor, perspective, weighting, or rating with notes or questions
invite others to contribute their perspectives and/or read and comment on other perspectives
copy and import rows, columns, or layers from other boxes
import box-like matrices of data from other online or paper table-structured resources using "grid grabber" utilities
unify (merge) rows and columns that are determined to represent the same option or factor (e.g., after an import from a box with differently labeled components)
split rows or columns that are determined to represent multiple options or factors
sort the rows, columns, and layers by a variety of criteria
hide and unhide rows, columns, and layers (filter)
be guided through various aspects of the choiceboxing process by wizard like interviews (factor definition wizard, tradeoff wizard, . . . )
access and adopt suggested options and factors based on the specified choice category and options/factors already in the box
access and adopt suggested ratings (informational or evaluative content) from other sources (free or for fee)
access and adopt suggested actions to be taken in reaching a decision
be prompted for and store facts and assumptions that are important to clarify in reaching a decision
access 'public boxes'—shared boxes with most common (frequent) options and factors in given categories, along with average (or recent) ratings from all (or a defined subset of) fellow choosers
enjoy built-in equalization (normalization) across factors and perspectives
apply non-linear scoring functions within a particular factor and across different units of value
maintain "living cells"—those linked to external sources of data, so that they are self-updating in real time (for example, stock quotes and video feeds)
receive alerts when a box has been changed, or a new option or factor has been determined to be recommendable, or a new sponsor would like to present itself
for all data in a box, ascertain who entered/changed it and when (history)
engage in simultaneous multi-user sessions
engage in qualitative or ordinal choiceboxing (see above)
interact with boxes that are designed to coordinate the separate but entangled decision frameworks of different parties to a mutual choice, such as a prospective employer and employee deciding whether to make/accept a job offer, or parties to a dispute or a business opportunity deciding whether to proceed with a particular settlement or deal, where the overall goodness of the common choice to the various parties is reciprocally a factor in the choices of the counterparties (discussed below)

specify provisionally or finally which option(s) are selected

Tags/Comments

In an exemplary embodiment, every aspect of a box can be annotated with one or more tags and/or comments, each time- and user-stamped. Comments can be used, for instance, to explain a weight or rating.

Various things can be tagged within a box or an entire choicespace—such as people, boxes, factors, options, comments. Tagging can be done ad hoc by users or automatically by the system.

People tags are essentially groups. Examples: family, business associates, hiring committee members. They can make it easier to invite multiple people into a box in a single step and to manage permissions by group.

Tagging boxes is useful when a user has more than a few. Example box tags include: current, personal, business, home, school. The box list could display a couple of boxes one has most recently accessed, then links to a list of older ones and/or categories into which they've been put.

Tagging factors can make boxes easier to organize, and support sub-factoring. Examples of factor categories: financial, features, must-haves, disqualifiers, discarded, rejected. System-computed tags for factors include 'incompletely defined' (and thus not yet includable in an assessment matrix.)

When two or more factors have been assigned to a tag, they can be grouped together in the box, and topped by a thin label row, showing that a tag sort has been chosen.

Option tags allow quick sorting/filtering by criteria such as houses on the beach, houses in the mountains, discarded, rejected.

Ratings can be tagged to signal (un)certainty, reliability, trustworthiness, recency.

Comments are also taggable. Example comment tags include: caution, explanation, disagreement, to-do, question, research note.

Some tags will naturally flow from the system itself (e.g. recently accessed), some from factors defined for a box or scores computed from ratings (e.g., houses with 3 bedrooms, cameras with night vision, top 5 overall choices, disqualified options), and some from ad hoc user designations.

Users can tag objects with one or more tags. One of those tags for a given item can be designated as the 'base tag', which then becomes the header under which the item is grouped by default when items of that kind are sorted by tags.

Tags can be both persistent and temporary. Examples of the latter would include items tagged for hiding, deletion, or copying into another box. Ratings and weightings can be tagged as requiring further attention (because they are guesses or otherwise tentative). Users can select multiple items (e.g. through shift/control click) and apply tags to them in batch. And conversely select all items presently tagged a particular way, and issue commands against them (hide, show, copy, delete).

Visible 'new' icons can be used to tag items that have been added or changed since a particular user visited a box.

Thus, in an exemplary embodiment, every box and its objects can be annotated with one or more tags and/or comments, each time- and user-stamped. Each tag or comment can be attached to one or more objects.

Tags and comments have properties such as

Types, such as explanation, characterization, or warning

Persistent or not (whether they survive the current session)

There can be system generated tags and comments. For example, that a rating should be reviewed in light of changes in the factor or option definition.

Exemplary Graphical User Interface

Some of the principles of choiceboxing discussed above are illustrated by screen shots from a prototype system. The example provided involves a law office choosing software for automated document drafting purposes. It should be noted that the screens are provided for exemplary purposes only, and some screens may be internally inconsistent and/or inconsistent with one or more other screens.

Figure 1:
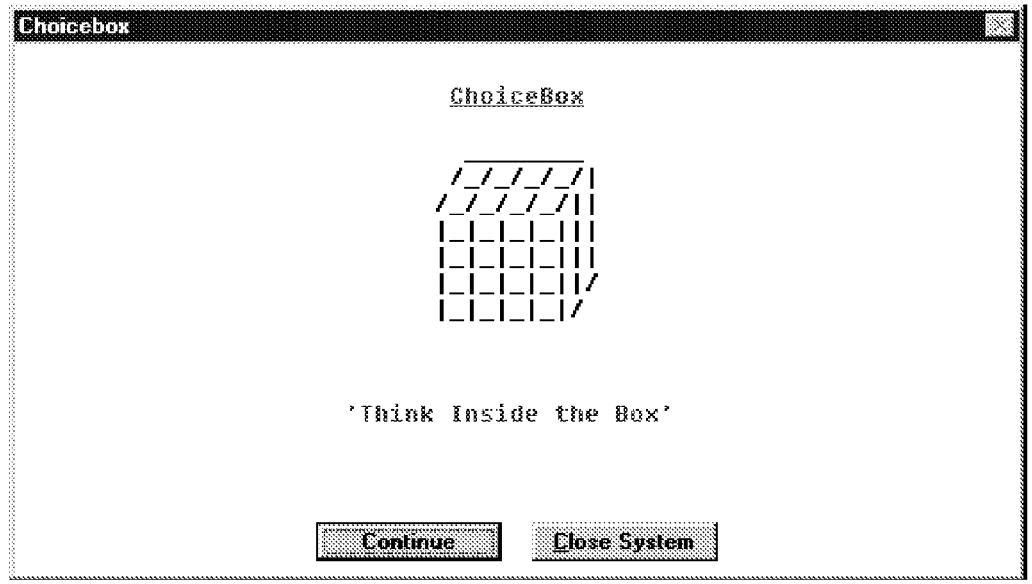
FIG. 1 shows a sample opening screen.

FIG. 1 shows a sample opening screen.

Figure 2:
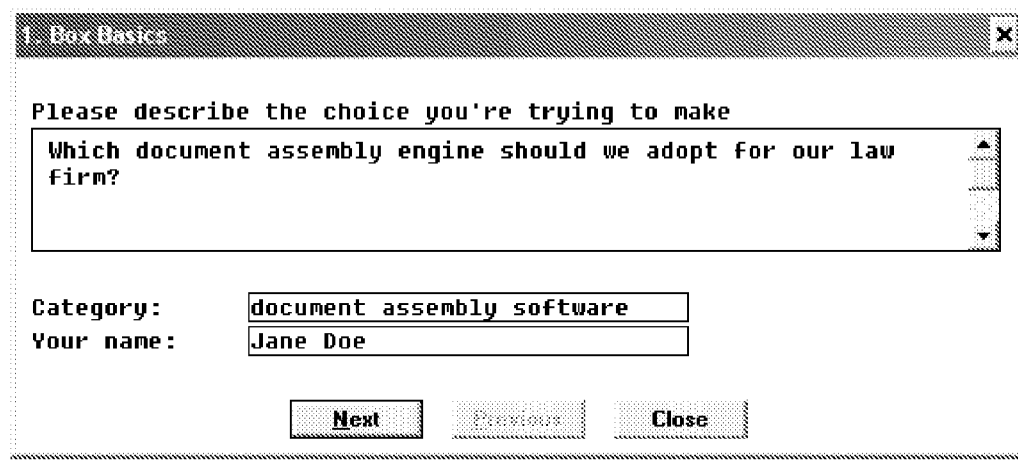
FIG. 2 shows a sample screen that elicits a description of the choice being made, the category for the choice, and the user's name.

FIG. 2 shows a sample screen that elicits a description of the choice being made, the category it is in, and the user's name. In the "Category" field, the user may be allowed to enter free-form textual information and/or may allow the user to select from a predetermined list of categories (e.g., a pull-down menu containing a predetermined list of categories and/or a list of previous choices made by other users in choicespace). It should be noted that embodiments of the present invention may identify the user based on the login session and may permit users to remain anonymous.

Figure 3:
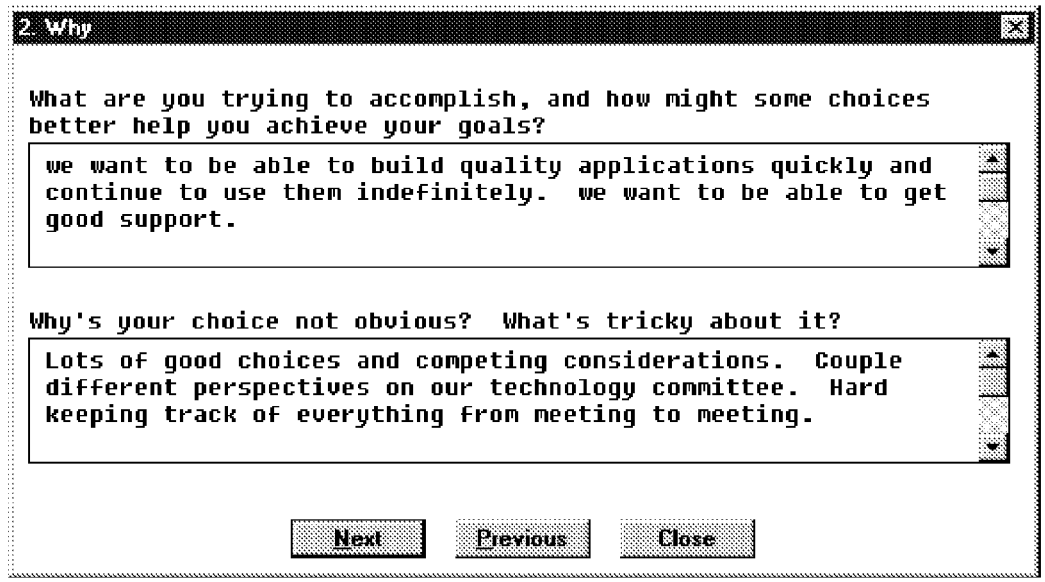
FIG. 3 shows a sample screen that gathers further information about goals being sought to be accomplished and why the right choice may not be obvious.

FIG. 3 shows a sample screen that gathers further information about goals being sought to be accomplished and why the right choice may not be obvious.

Figure 4:
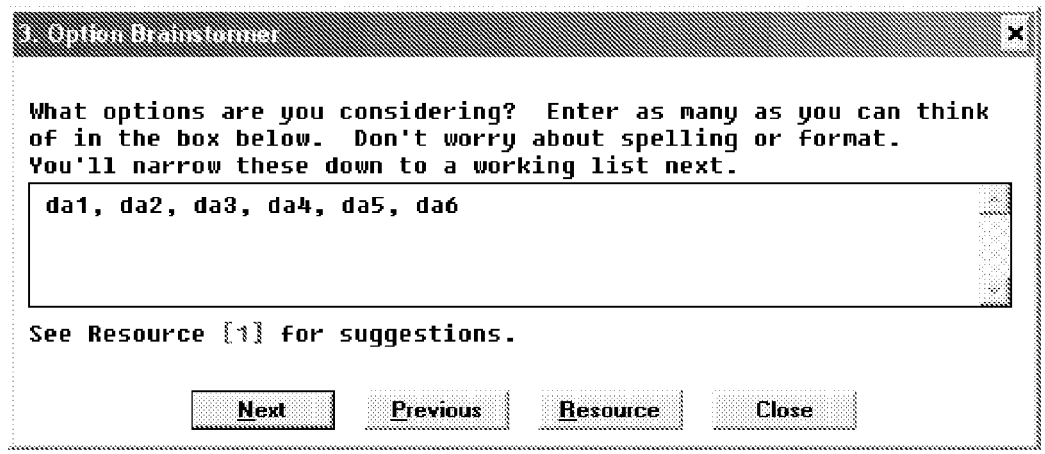
FIG. 4 shows a sample screen that elicits a preliminary list of options being considered.

FIG. 4 shows a sample screen that elicits a preliminary list of options being considered. Here, the user has entered options identified as da1, da2, da3, da4, da5, and da6. This screen includes a "resource" tab from which the user can obtain a list of possible options (i.e., suggestions).

Figure 5:
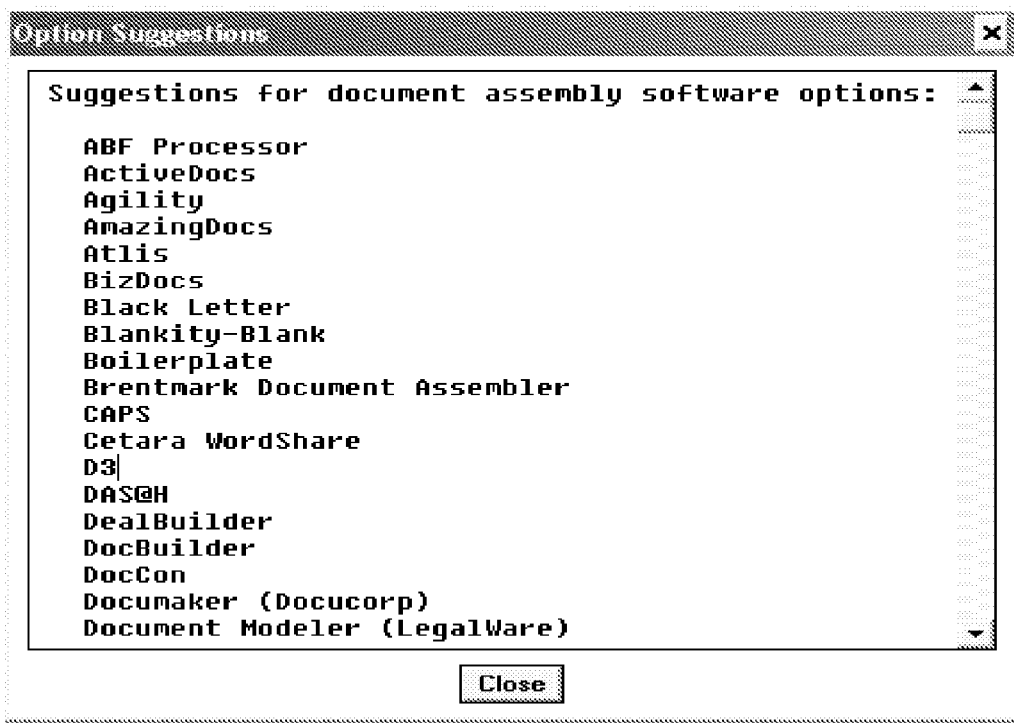
FIG. 5 shows a sample screen that supplies a set of context-specific suggestions that the user can adopt.

FIG. 5 shows a sample screen that supplies a set of category-specific suggestions that the user can adopt. This screen is shown when the user selects the "resource " tab of the screen shown in FIG. 4. The set of category-specific suggestions may be derived from information entered by the user through the screens shown in FIGS. 2-4 and may involve accessing a database, search engine, or other information source.

Figure 6:
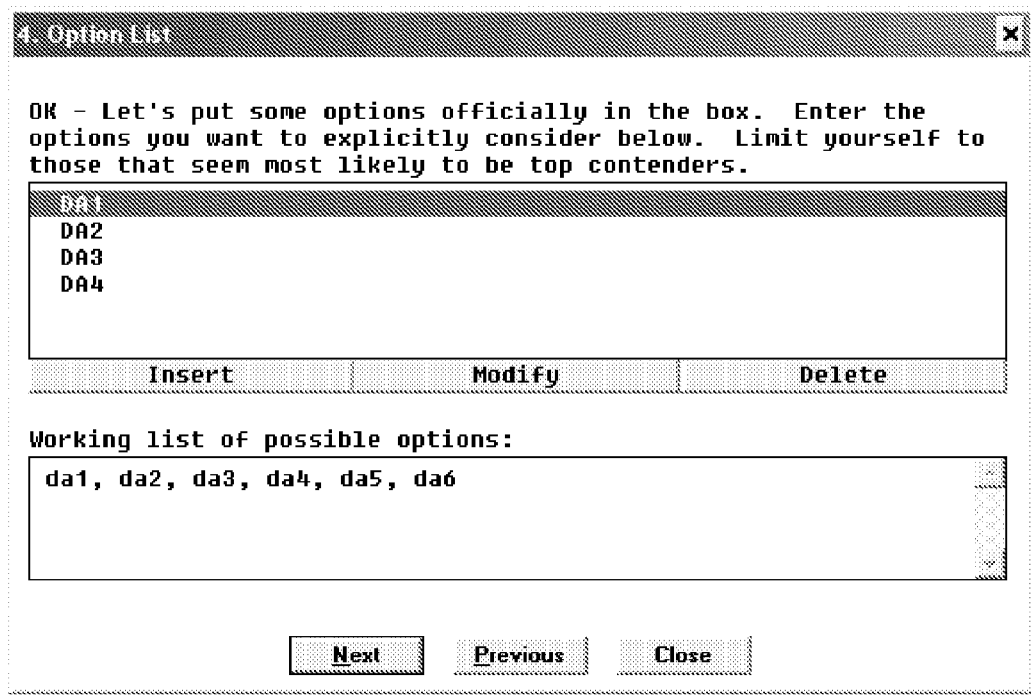
FIG. 6 shows a sample screen that asks the user to select the options from their informal list that they want to explicitly consider, with the working list re-presented for ease of recall.

FIG. 6 shows a sample screen that asks the user to select the options from their informal list that they want to explicitly consider. Their working list is re-presented for ease of recall. Here, the user has selected options DA1, DA2, DA3, and DA4.

Figure 7:
FIG. 7 shows a sample screen that allows the user to enter detailed information for a selected option, with fields for short name, description, and notes.

FIG. 7 shows a sample screen that allows the user to enter detailed information for a selected option (in this case, option DA2), with fields for short name, description, and notes.

Figure 8:
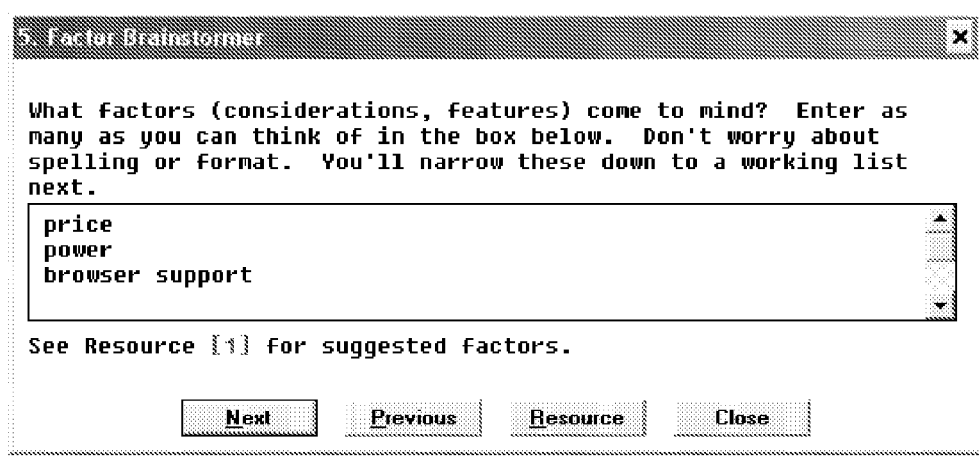
FIG. 8 shows a sample screen that elicits a preliminary list of factors for consideration.

FIG. 8 shows a sample screen that elicits a preliminary list of factors for consideration. Here, the user has specified price, power, and browser support as factors to be considered. Similar to the screen shown in FIG. 4, this screen includes a "resource " tab from which the user can obtain a list of possible factors for consideration (i.e., suggestions).

Figure 9:
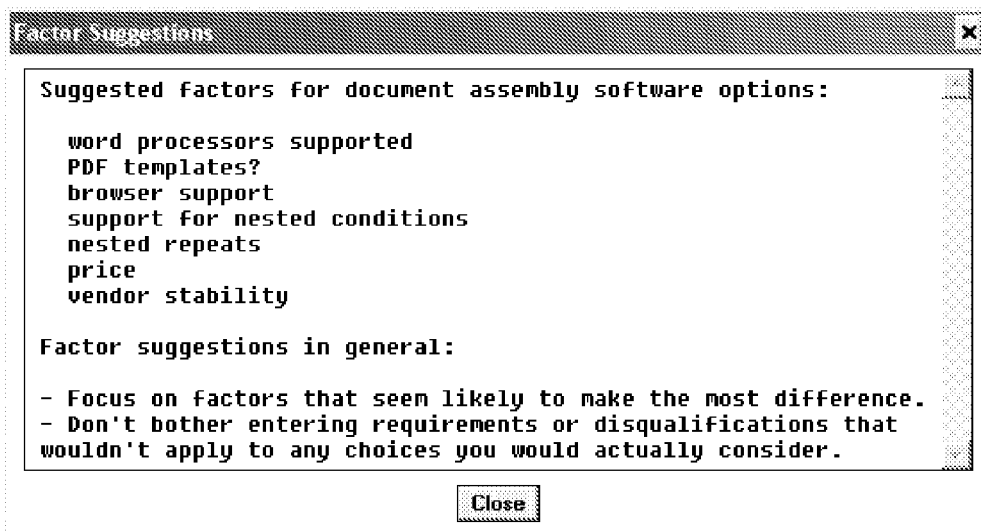
FIG. 9 shows a sample screen including both category-specific and generic factors the user may wish to include.

FIG. 9 shows a sample screen including both category-specific and generic factors the user may wish to include. This screen is shown when the user selects the "resource " tab of the screen shown in FIG. 5. The set of suggestions may be derived from information obtained from a database, search engine, or other information source.

Figure 10:
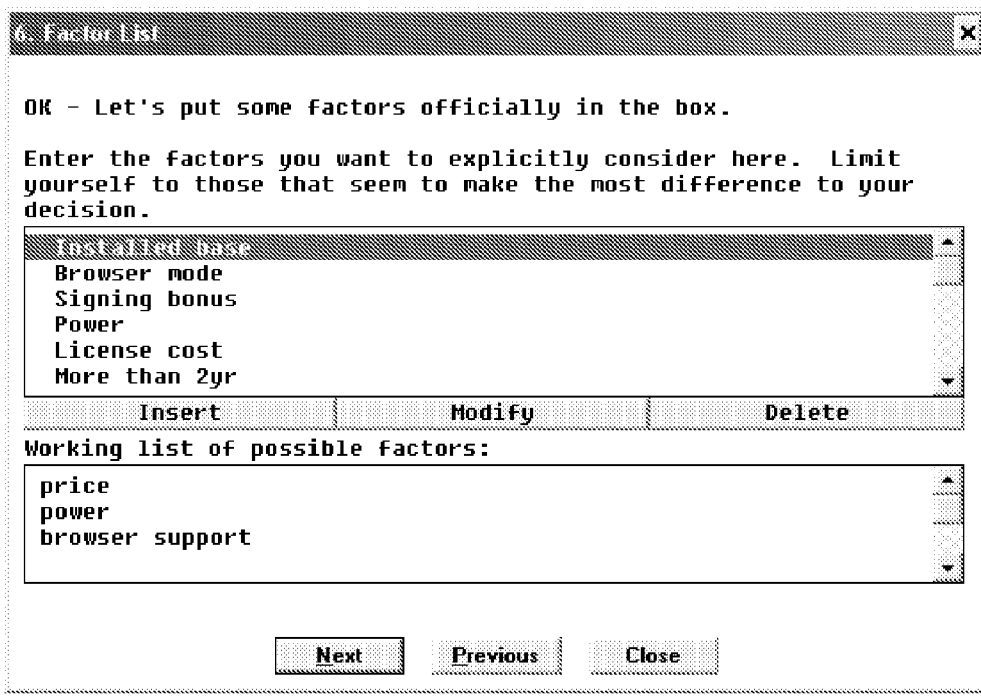
FIG. 10 shows a sample screen asking the user to select the factors from their informal list that they want to explicitly consider.

FIG. 10 shows a sample screen asking the user to select the factors that they want to explicitly consider. Here, the factors selected include "installed base" (e.g., approximately how many copies are installed on customer desktops), "browser mode" (e.g., does the software work with only a browser), "signing bonus" (e.g., has the software company offered a bonus if their software is selected), "power" (e.g., how powerful in general is the software, on a scale from 1 to 10), "license cost" (e.g., how much does it cost), and "more than 2 yr" (e.g., is the product more than two years old).

Figure 11:
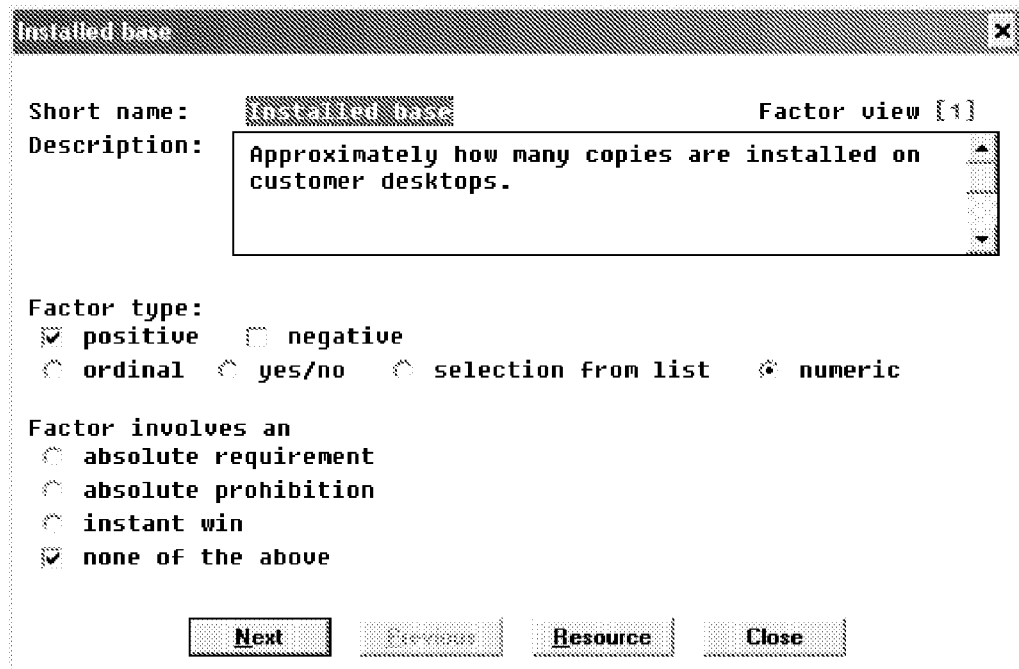
FIG. 11 shows a sample screen for defining detailed information about a particular factor, with some aspects of its definition being elicited.

FIG. 11 shows a sample screen for defining detailed information about a particular factor (in this case, the "installed base" factor), with some aspects of its definition being elicited. Here, the installed base factor is defined as positive, numeric value (i.e., the score is added to the total). Similar screens would be used to define detailed information for the other factors. It should be noted that the "licensing cost" factor is considered a negative, i.e., the score is subtracted from the total such that higher cost reduces the total score for an option. While this sample screen includes checkboxes for specifying whether the factor is considered to be a positive or negative value, such "polarity" of the factor may be built into the scoring function for a particular factor rather than being configured as a separate parameter.

Figure 12:
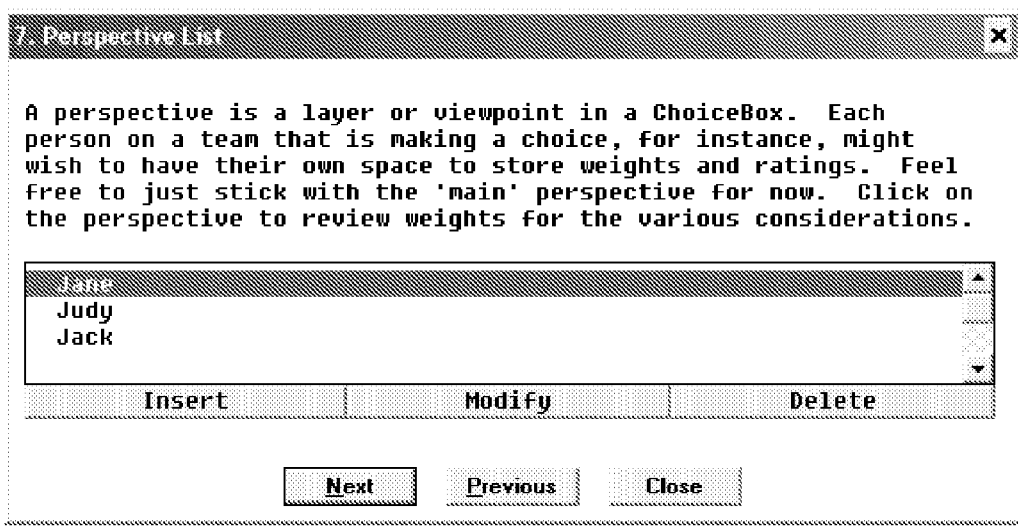
FIG. 12 shows a sample screen in which the user is being asked to identify any additional perspectives they may wish to include in their box.

FIG. 12 shows a sample screen in which the user is being asked to identify any additional perspectives they may wish to include in their box. Here, three perspectives are defined, namely perspectives for people named Jane, Judy, and Jack.

Figure 13:
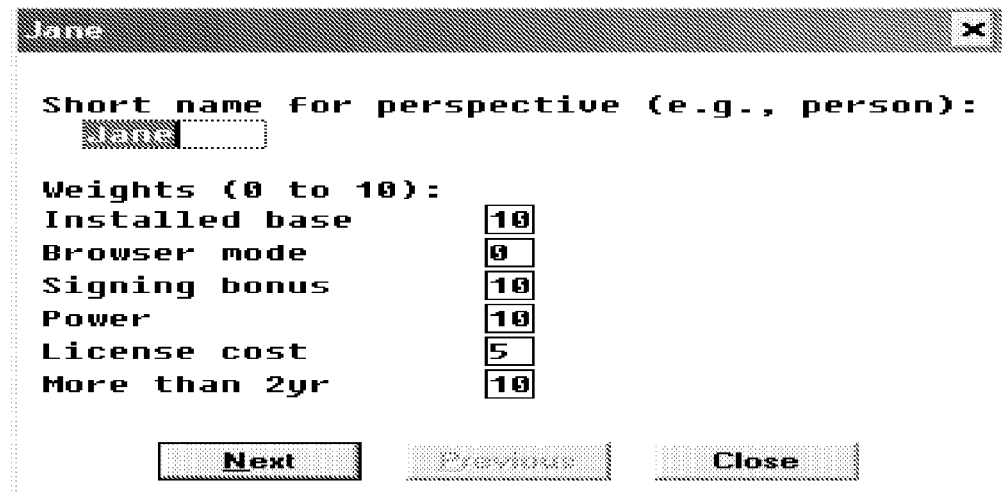
FIG. 13 shows a sample screen for one perspective, along with weights for factors in that perspective.

FIG. 13 shows a sample screen for one perspective (in this case, Jane's perspective), along with weights for factors in that perspective. The weights are typically populated with a default set of weights (e.g., defined by the box owner). Similar screens would be used to define perspectives for Judy and Jack.

Figure 14:
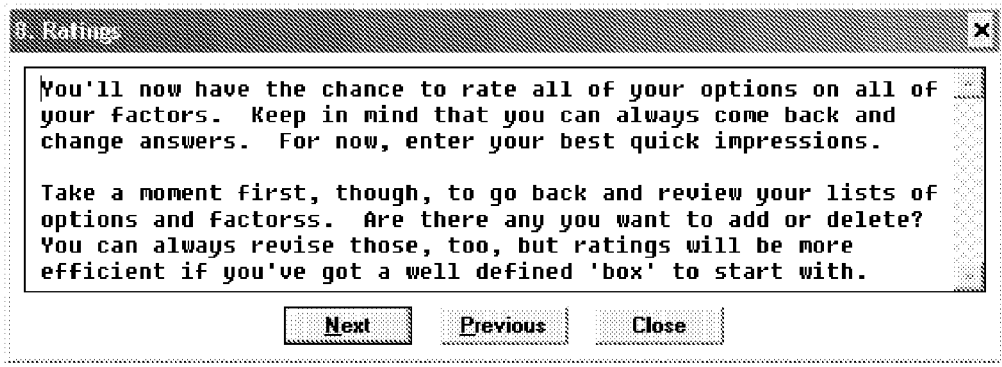
FIG. 14 shows a sample screen that introduces the process of gathering ratings for options on factors.

FIG. 14 shows a sample screen that introduces the process of gathering ratings for options on factors.

After options, factors, and perspectives have been defined, the users can access various screens in order to provide ratings for each of the factors, with each screen presenting a slice for one factor at a time. FIGS. 15 and 16 respectively show sample screens for the "installed base" and "browser mode" factors. Here, user ratings for all options across all perspectives are shown in the screens, although it should be noted that, alternatively, only one perspective may be shown in a given screen (e.g., to hide other users' perspectives from the user). The user can choose to display the raw input or the computed scores associated with the inputs. Similar screens would allow access to the ratings and scores for the other factors.

Figure 17:
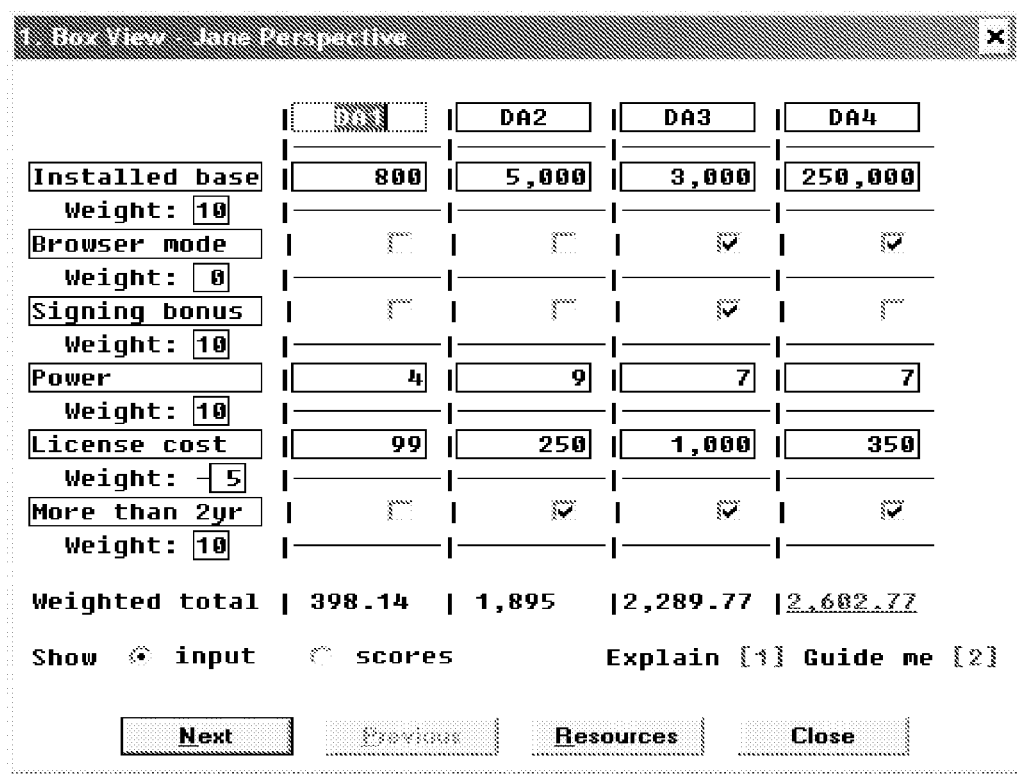
FIG. 17 shows a sample screen with ratings for all options on all factors for a particular perspective.

FIG. 17 shows a sample screen for Jane's perspective, showing ratings for all options on all factors. Weighted totals are shown at the bottom. There are links to an explanation and to a wizard ("Guide Me"), which takes the user sequentially through screens as shown in FIGS. 2 through 16. Once a box has been initially configured, the user has the option to jump immediately to a view like that in FIG. 17.

FIG. 18 shows a sample screen for Jane's perspective, but showing scores rather than raw inputs as in FIG. 17. Here, for each factor, the scores assigned to the various options are computed by assigning a score of 100 to the option having the highest rating and then setting the scores of the other options to the relative percentage of the option's rating to the highest rating. Thus, for example, the score for DA1 for the installed base factor is equal to ((800/250000)*100) or 0.32, and the score for DA3 for the power factor is equal to ((7/9)*100) or 77.77. Similarly, the score for DA2 for the license cost factor is equal to ((−250/1000)*100) or −25. The weighted total for each option is the sum of each score times its respective weight. Thus, for example, the weighted total for DA1 is equal to ((0.32*10)+(0*10)+(44.444*10)+(−9.9*5)+(0*10)) or 398.14. It should be noted that, in this example, the browser mode factor is not included in the weighted total because its weight is zero.

FIGS. 19 and 20 respectively show sample screens for Judy's and Jack's perspective layers.

FIG. 21 shows a summary layer, with totals across the perspective layers of FIGS. 18-20. Here, the amount in each box is the sum of the corresponding boxes from the three perspective layers shown in FIGS. 18-20. For example, the total score for DA1 for the installed base factor is equal to (0.32+25+0.5) or 25.82, and the weighted total for DA4 is equal to (2,602.77+2,510+1,497.5) or 6,610.27.

As mentioned above, different weights may be assigned to the different perspectives, for example, to reflect the relative importance of each user (e.g., levels of expertise or trust) or to normalize the tendencies of the different users (e.g., with respect to the way the users rate and/or weight the various factors). The perspectives can be weighted in any of a variety of ways. One way to weight the perspectives is to assign each perspective a number of votes or shares toward the final decision (e.g., each perspective may be assigned one vote). Thus, for example, Jane's perspective in FIG. 18 might be considered as a vote for DA4, Judy's perspective in FIG. 19 might be considered as a vote for DA3, and Jack's perspective in FIG. 20 might be considered as a vote for DA4, such that DA4 receives two votes, DA3 receives one vote, and DA1 and DA2 receive no votes. The number of votes or shares may be shown in the summary layer of FIG. 21 (e.g., in additional to the weighted totals or in lieu of the weighted totals) and/or may be shown in a separate summary screen. FIG. 22 shows a variation of the sample summary layer of FIG. 21, showing votes instead of weighted totals.

Figure 23:
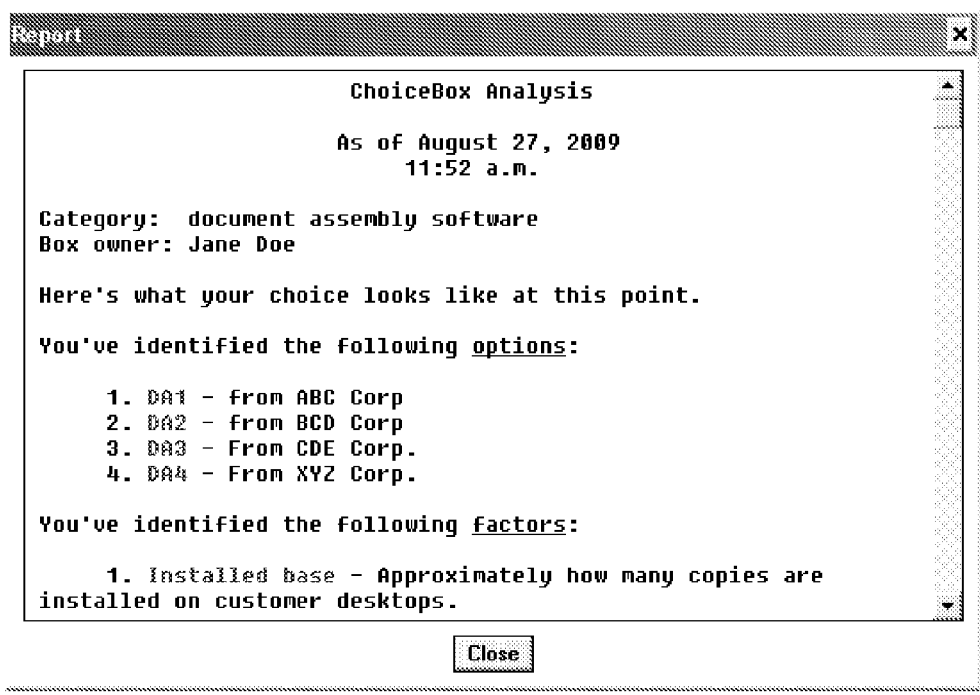
FIG. 23 shows an initial screen of a sample report available via the Explain link.

FIG. 23 shows an initial screen of a sample report available via the Explain link. The following is the full text of this sample report:
ChoiceBox Analysis
As of Aug. 27, 2009
   11:52 a.m.
Category: document assembly software
Box owner: Jane Doe
Here's what your choice looks like at this point.
You've identified the following options:
   1. DA1—from ABC Corp
   2. DA2—from BCD Corp
   3. DA3—From CDE Corp.
   4. DA4—From XYZ Corp.
You've identified the following factors:
   1. Installed base—Approximately how many copies are installed on customer desktops.
   2. Browser mode—Does the software work with only a browser?
   3. Signing bonus—Has the company offered us a million dollar bonus if we select their product?
   4. Power—How powerful in general is the software, on a scale of 1 to 10?
   5. License cost—How much does it cost?
   6. More than 2 yr—Product is more than two years old
You've identified the following different perspectives:
   1. Jane
   2. Judy
   3. Jack
The highest ranked option at present is DA4, with an overall weighted total of 6,610.27. Here's where that score came from:
Jane perspective
   Installed base—Weight: 10*score: 100=1,000
   Browser mode—Weight: 0*score: 100=0
   Signing bonus—Weight: 10*score: 0=0

Power—Weight: 10*score: 77.77=777.77
License cost—Weight: 5*score: −35=−175
More than 2 yr—Weight: 10*score: 100=1,000
Judy perspective
   Installed base—Weight: 7*score: 100=700
   Browser mode—Weight: 8*score: 100=800
   Signing bonus—Weight: 10*score: 0=0
   Power—Weight: 9*score: 80=720
   License cost—Weight: 6*score: −35=−210
   More than 2 yr—Weight: 5*score: 100=500
Jack perspective
   Installed base—Weight: 5*score: 100=500
   Browser mode—Weight: 3*score: 100=300
   Signing bonus—Weight: 5*score: 0=0
   Power—Weight: 5*score: 87.5=437.5
   License cost—Weight: 4*score: −35=−140
   More than 2 yr—Weight: 4*score: 100=400
Here's how all the options ranked:

| Jane perspective | |
| --- | --- |
| DA4 | 2,602.77 |
| DA3 | 2,289.77 |
| DA2 | 1,895 |
| DA1 | 398.14 |
| Judy perspective | |
| DA3 | 2,770 |
| DA4 | 2,510 |
| DA2 | 1,775 |
| DA1 | 655.6 |
| Jack perspective | |
| DA4 | 1,497.5 |
| DA3 | 1,182.5 |
| DA2 | 825 |
| DA1 | 275.4 |

The following options are "instant wins": DA3 (from Jane perspective), DA3 (from Judy perspective), and DA3 (from Jack perspective).

The following choices are "instant losers": DA1 (from Jane perspective), DA1 (from Judy perspective), and DA1 (from Jack perspective).

The largest weight difference between perspectives is 8, between Judy and Jane on Browser mode.

The largest rating difference between perspectives is 73%, between Judy and Jane on Installed base for DA2.

Your factors in order of weight are as follows:

| Jane perspective | |
| --- | --- |
| Installed base | 10 |
| Signing bonus | 10 |
| Power | 10 |
| More than 2 yr | 10 |
| License cost | 5 |
| Browser mode | 0 |
| Judy perspective | |
| Signing bonus | 10 |
| Power | 9 |
| Browser mode | 8 |
| Installed base | 7 |
| License cost | 6 |
| More than 2 yr | 5 |
| Jack perspective | |
| Installed base | 5 |
| Signing bonus | 5 |
| Power | 5 |
| License cost | 4 |
| More than 2 yr | 4 |
| Browser mode | 3 |

Your factors in order of differentiating power are as follows:

| Jane perspective | |
| --- | --- |
| Signing bonus | 6,000 |
| More than 2 yr | 6,000 |
| Installed base | 5,996.8 |
| Power | 3,333.33 |
| License cost | 2,803 |
| Browser mode | 0 |
| Judy perspective | |
| Browser mode | 6,400 |
| Signing bonus | 6,000 |
| Installed base | 3,500 |
| License cost | 3,363.6 |
| More than 2 yr | 3,000 |
| Power | 2,160 |
| Jack perspective | |
| Installed base | 3,020 |
| Signing bonus | 3,000 |
| Browser mode | 2,400 |
| More than 2 yr | 2,400 |
| License cost | 2,242.4 |
| Power | 1,250 |

Printed reports may include bar codes, URLs, GUIDs, or other indicia in order to facilitate re-association with online boxes via bar code readers or other devices.

Figures 24, 25:
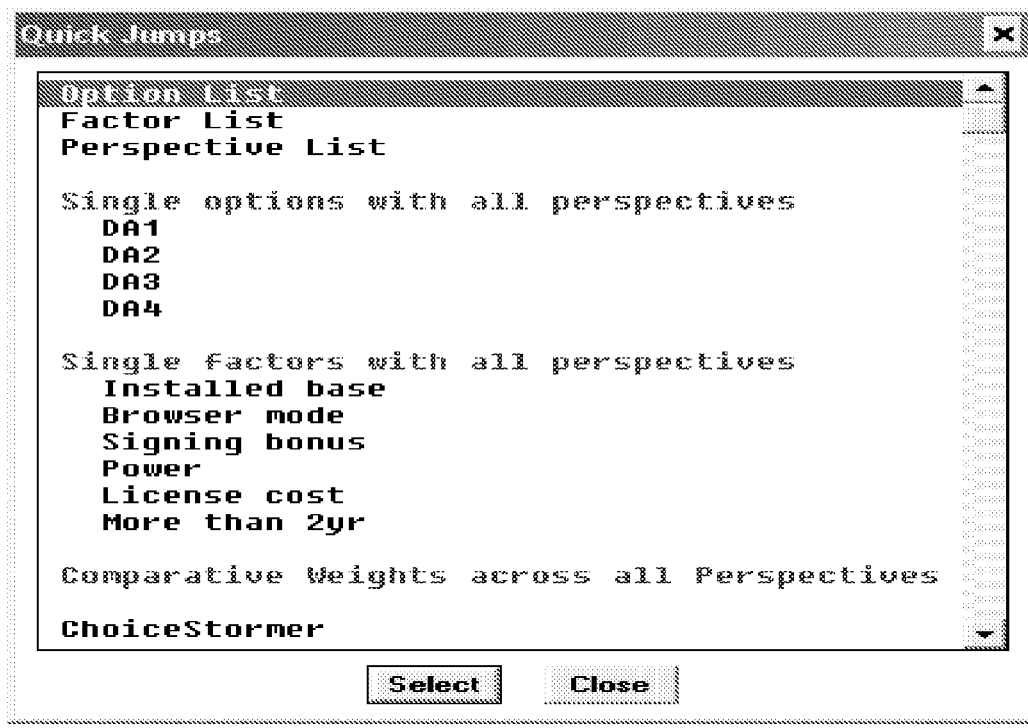
FIG. 24 shows a sample "quick jumps" menu from which the user can access all parts of the system.
FIG. 25 shows a sample option slice including ratings on all factors and from all perspectives on a single option.

FIG. 24 shows a sample "quick jumps" menu from which the user can access all parts of the system.

FIG. 25 shows a sample option slice, including scores on all factors and from all perspectives on a single option (in this case, the DA1 option). The ratings, rather than the scores, may be displayed by selecting the "input" button.

FIG. 26 shows a sample factor slice, including ratings on all options from all perspectives on that factor (in this case, the "installed base" factor).

FIG. 27 shows a sample screen including the comparative weights assigned to factors across all perspectives.

Figure 28:
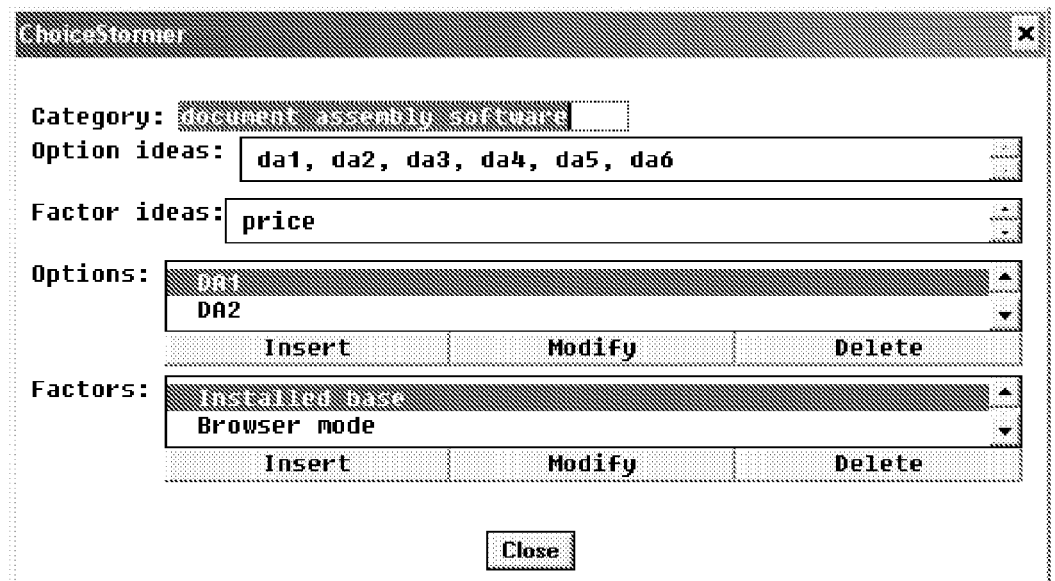
FIG. 28 shows a "choicestormer" window, in which the context, options, and factors can be explored in mutually dynamic ways.

FIG. 28 shows a "ChoiceStormer" window, in which the category, options, and factors can be explored in mutually dynamic ways. ChoiceStormer is a utility that lets users dynamically explore options, factors, and categories, where each realm presents material based on the current choices in the other realms. It includes a single screen with panes for linked searches for options and factors and for dragging any of each into a box in progress. Users can keyword search or navigate a category graph (discussed below) and select one or more categories, at which point highly associated options and factors are presented for selection in the other panes. Alternatively, users can keyword search the choicespace for options or factors, select one or more of each, and see a list of closely associated categories.

Figure 29:
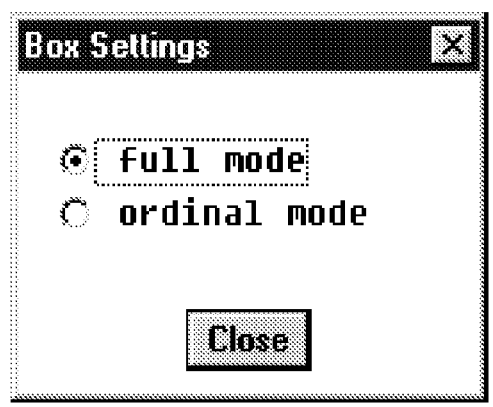
FIG. 29 shows a sample screen for allowing the user to choose to interact with a box in ordinal mode.

FIG. 29 shows a sample screen for allowing the user to choose to interact with a box in ordinal mode as discussed above, as opposed to full mode.

FIGS. 30-34 and 36-37 show alternative skins and visualizations through which box content can be rendered, in accordance with various exemplary embodiments of the present invention. It should be noted that embodiments are not limited to these specific display formats.

Figure 30:
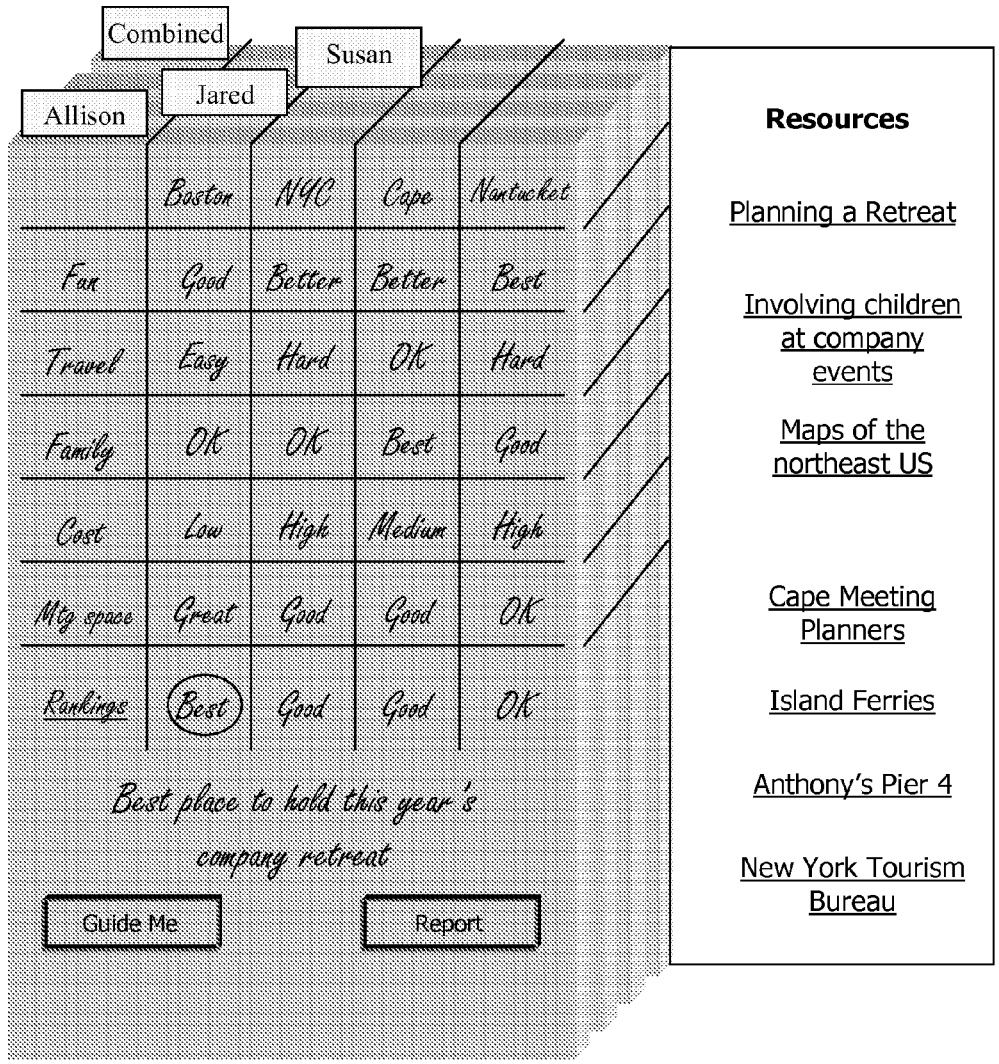
FIG. 30 shows a choicebox represented in a sample option pad format.

FIG. 30 shows a choicebox represented in an option pad format. Here, there are perspectives for Allison, Jared, and Susan as well as a "Combined" summary perspective. A user can select one of the tabs to bring the corresponding perspective to the forefront. Also, the user can select a particular option to view a "vertical" slice including the ratings or scores for all factors across all perspectives for the selected option, and the user can select a particular factor to view a "horizontal" slice including the ratings or scores for all options across all perspectives for the selected factor. This screen includes links to various related resources.

FIG. 31 shows a choicebox represented in an optional discussion box format. This screen includes various tags/comments (e.g., a comment by Andy on his weighing of the "Hourly cost" factor that the hourly rate has to be a top priority, and a comment by Marc agreeing that law firm 5 might be hard to work with). In Andy's perspective, which is at the forefront, the weighted total for law firm 1 is highlighted in green to signify that it has the highest weighted total within Andy's perspective. This screen includes links to various choicebox sponsors.

FIG. 32 shows an alternative choicebox representation in the form of a grid with three-pane cells, using different colors to highlight user-entered weights and ratings, computed ranks and scores, computed highest ranked option, and editable text areas.

FIG. 33 shows yet another alternative choicebox representation that uses three-dimensional shapes (e.g., rectangular prisms) to signify the relative "volume" of positive and negative value represented by specific options on specific factors, and cumulatively for each option across all factors. For convenience, such use of three-dimensional shapes may be referred to as value-volumetrics. In this example, the color of the prism is used represent its valence (e.g. the prisms related to the "Expertise" factor are green to signify a positive valence, i.e., a bigger prism represents a better value, and the prisms related to the "Hourly rate" factor are red to signify a negative valence, i.e., a bigger prism represents a worse value—higher costs). The dimensions of the prism in a given cell (height, width, depth) correspond to the weight of the factor, the score of the option on the factor, and the weight of the perspective on the factor. The dimensions of the prism representing the total net value of an option on an individual perspective layer, and of the prism representing the total net value of an option across all perspectives, can be whatever is desired, so long as they produce the appropriate net volume. Typically, cubes serve well for total net value purposes, although other shapes may be used, and two dimensions of the total boxes may be fixed in order to make the relative differences clearer.

Figure 34:
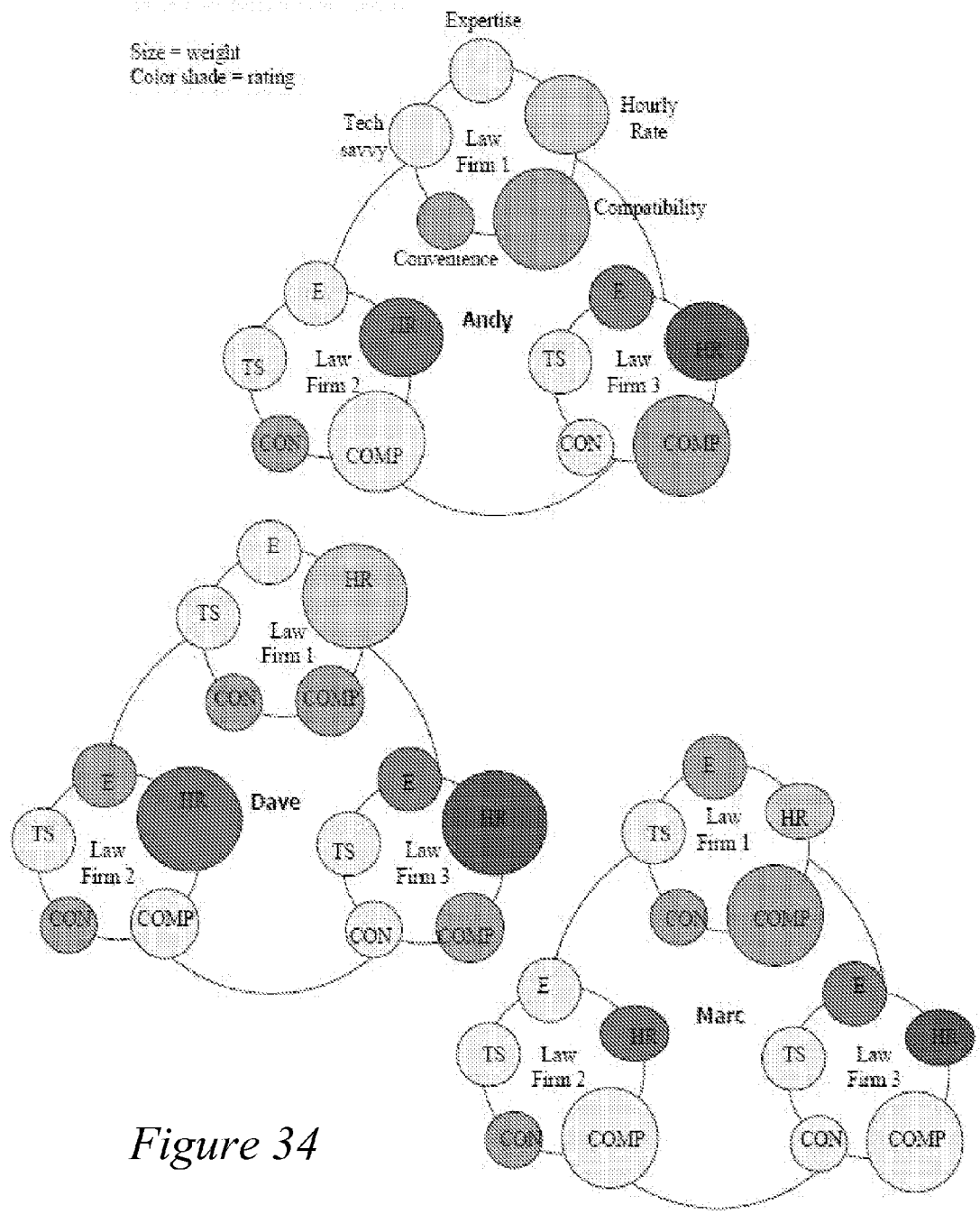
FIG. 34 shows still another choicebox representation in the form of a nested circles "skin."

FIG. 34 shows still another choicebox representation in the form of a nested circles "skin," where the size of an oval represents its weight in the perspective and the color shading of an oval represents its rating in the perspective.

Figure 36:
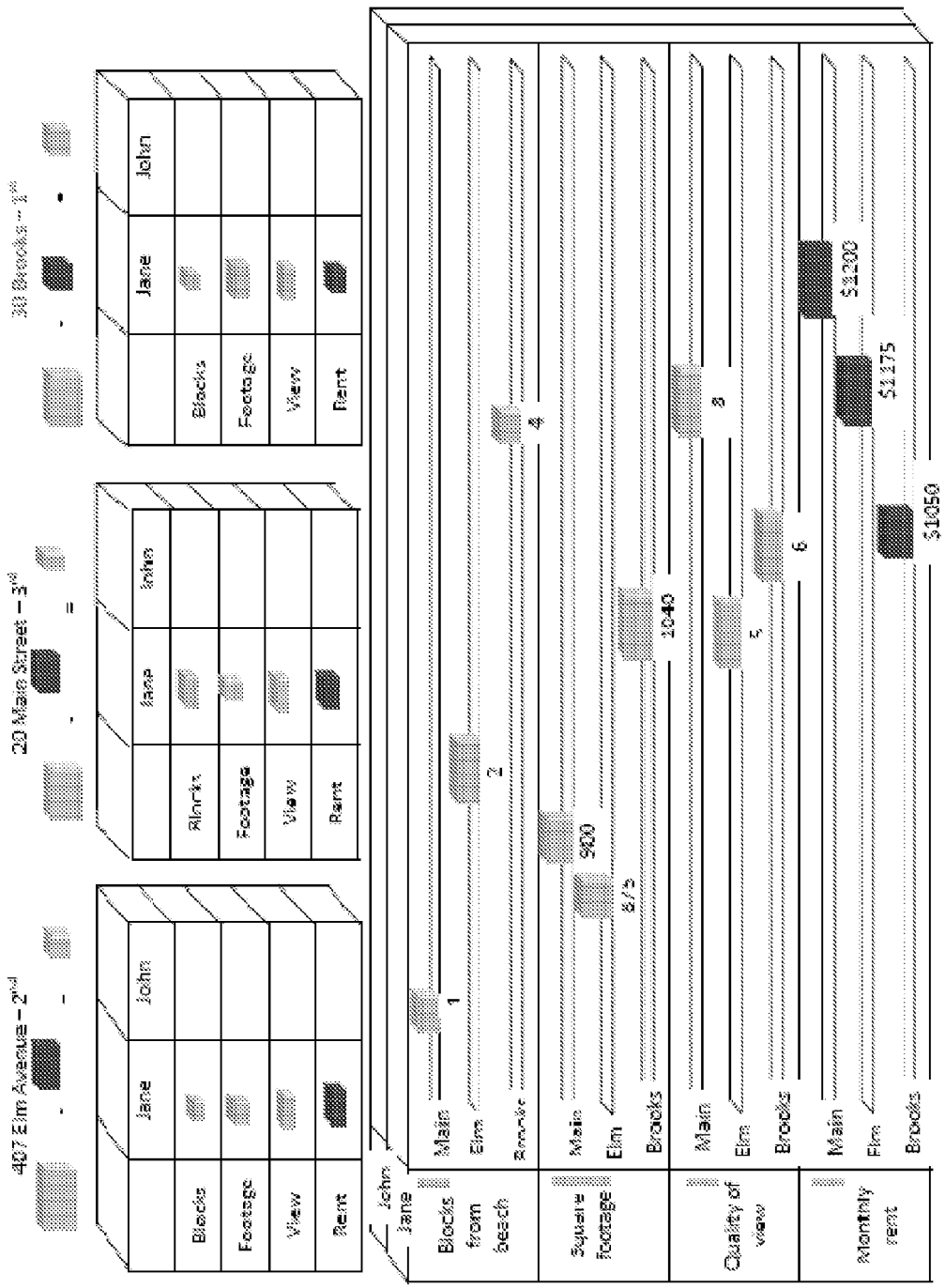
FIG. 36 shows a choicebox represented in a sample slidebox format.

FIG. 36 shows a slidebox in accordance with an exemplary embodiment of the present invention. This interface provides a visualization of a choice in progress that makes all dimensions transparently and intuitively clear. This optional interface serves well when choices have been narrowed down to a few options and factors. Compared to the standard choicebox view:

Instead of columns for each option, there is a single rating column, in the cells of which all of the options have a 'lane' on which a sliding box signifies both ratings and scores. This makes it easy to see and manipulate their comparative ratings and scores. Lanes can be invisible.

Boxes can slide continuously on a lane, or only from one notched position to another, depending on the factor definition.

Factors whose definitions pose no lower and/or upper limit on ratings will have lanes that permit unlimited box sliding, with positions of all ratings adjusting proportionately to accommodate the most extreme ones.

The value boxes can serve as knobs on the slider controls. The horizontal position of each box reflects the rating of an option on a factor, which is shown in the label below. Its width is proportionate to the normalized score corresponding to that rating. Its height is proportionate to the weight assigned to the factor on the perspective. Its depth is proportionate to the weight assigned to the perspective on the factor (i.e., how much importance to be accorded to the opinion expressed by the person or persons corresponding to that perspective.)

As one changes any weight or rating, the corresponding boxes in the option lanes and the overall totals change.

As one moves a box to express a rating, its width will typically change (reflecting the score for that rating). But its height or depth change only when the weight of the factor or perspective change.

All value boxes in each row of a perspective have the same height and depth at any given time.

Users can type or pick a rating right within the label of a box and have it snap into position (as an alternative to sliding it precisely where they want it.)

Before an option has a rating on a factor, the corresponding box may have a blank label and be docked on the left side of the lane.

The scoring functions associated with ratings can be made accessible by clicking on an appropriate icon associated with each factor (on each perspective.)

Factor weights and perspective weights, represented by orthogonal line segments, can be directly manipulated.

One variant is to include perspective-specific total boxes for each option (in FIG. 36, just the global totals are shown for each option).

Figure 37:
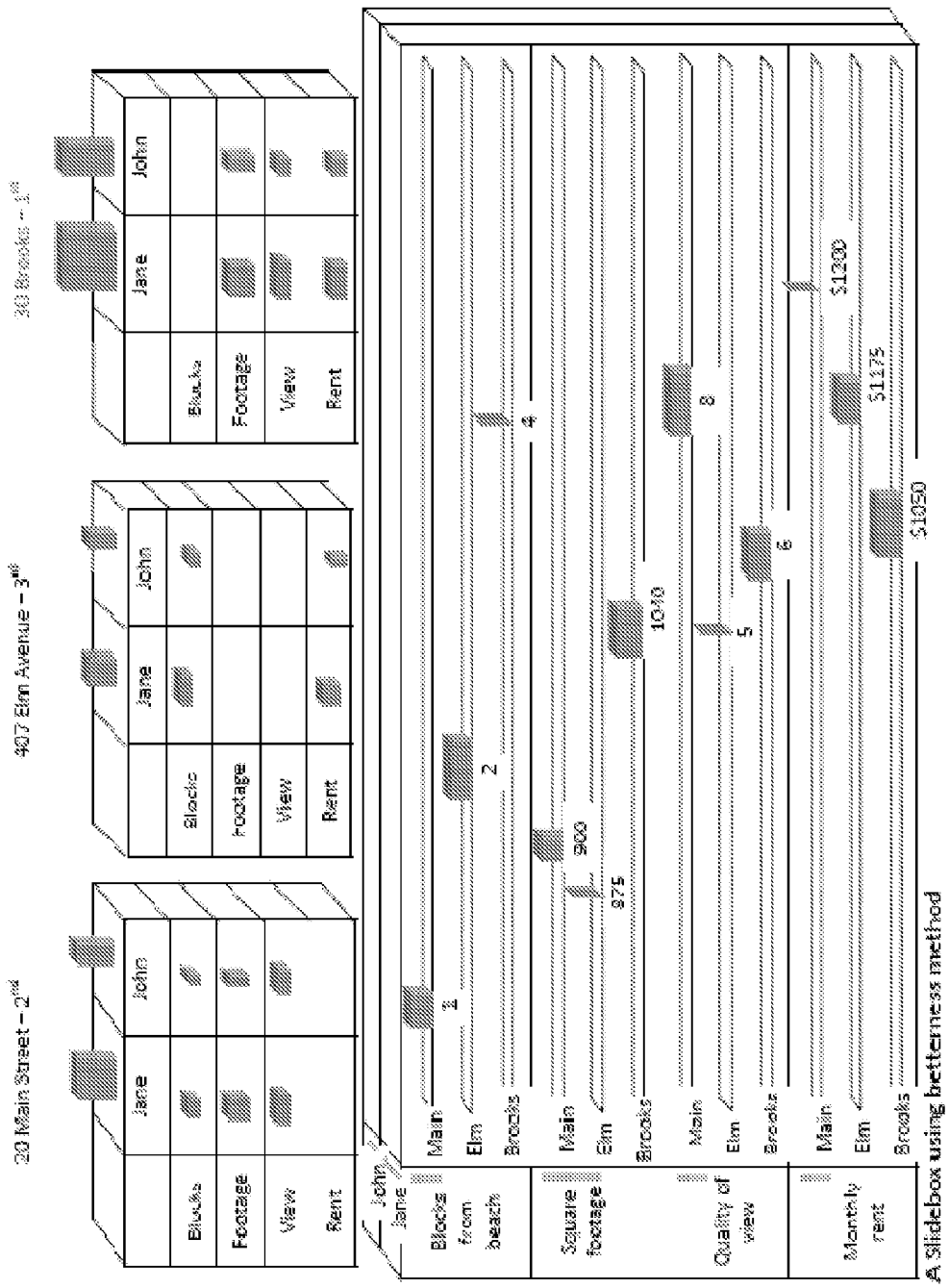
FIG. 37 shows a choicebox represented in an alternative slidebox format.

Another variant on the slidebox interface, shown in FIG. 37, uses a relative 'betterness' approach instead of absolute goodness/badness. Each option is assigned a degree of betterness on each factor for each perspective. The amount of betterness—represented by value box width in this interface—is the difference between the goodness of an option (the value assigned to its rating by the scoring function) and that of the lowest-rated option on that factor. The least valued option on a factor thus has zero betterness, and zero width. (Options with zero width can be represented in the slidebox as a vertical line with an attached label.) FIG. 37 also has illustrative bars to signify potentially differing perspective weights. (Imagine here, for instance, that John is a room-mate who will only occupy the apartment part-time due to regular business out of town, and whose opinions may thus be entitled to less weight).

Choicespace Operations

Various operations can be performed against a collection of boxes, e.g. in a choicespace being managed by a CSP. A sub-space is a specified sub-set of the choicespace collection, for example just choiceboxes that have had activity in the last thirty days, or those from which a transaction has been consummated. For example, users typically can:

manage sets of boxes in categories that involve simultaneous, interacting choices like renovating a home or running a business—e.g., by declaring them part of a project search for boxes that are public (or otherwise visible to the particular user) that are similar to one in progress, based upon search parameters or metrics of boxspace proximity that take into account categories and factor overlaps.

maintain persistent boxes or wish lists (boxes that start out choice-less: "I'm looking for a good . . . " and that are either posted somewhere for responses, or used as a search specification—desire boxes, wish boxes (discussed below)

CSPs and their users can:

observe collective behavior within and across categories, both to feed back collective wisdom to individual users and to supply market research to providers open sponsor/helper 'master box' views. A helper, paid or unpaid, may use such a view to record an array of assessments across a wide array of options and factors that transcend any particular box, yet that project themselves as perspectives in existing or new boxes where invited. People are able to copy or clone ratings from their master box, and conversely, write back to a master box from a particular perspective being worked on elsewhere. (discussed below)

Views/Sessions

Generally speaking, a choicebox session involves a user engaging in one or more views of one or more choiceboxes. A choicebox session may involve opening a choicebox or creating a choicebox by a user and may end with the user navigating to a different box or closing the interface in which the choicebox was being viewed. Sessions can also time out. Several users can simultaneously have sessions with the same choicebox at the same time, possibly looking at different parts in different configurations.

Different configurations and renderings of a choicebox are referred to as views. One view can differ from another in terms of which options, factors, and perspectives are shown (how they are filtered); which order they are in (how they are sorted); and which face or slice of the box is being examined (how the box is oriented).

Most of the time, users work in a particular perspective layer. But sometimes it is useful to 'cut' a box into alternative (orthogonal) slices. For example, one slice could show ratings for all the factors and perspectives for a single option, or ratings for all the options and perspectives for a single factor. A slice could show all the weights expressed across all factors by all perspectives. Users might also inspect a given stick—a column, row, or z-axis range of adjacent cells, like the ratings of a particular option on all factors from a single perspective, or the weights of all perspectives on a particular factor.

Figure 39:
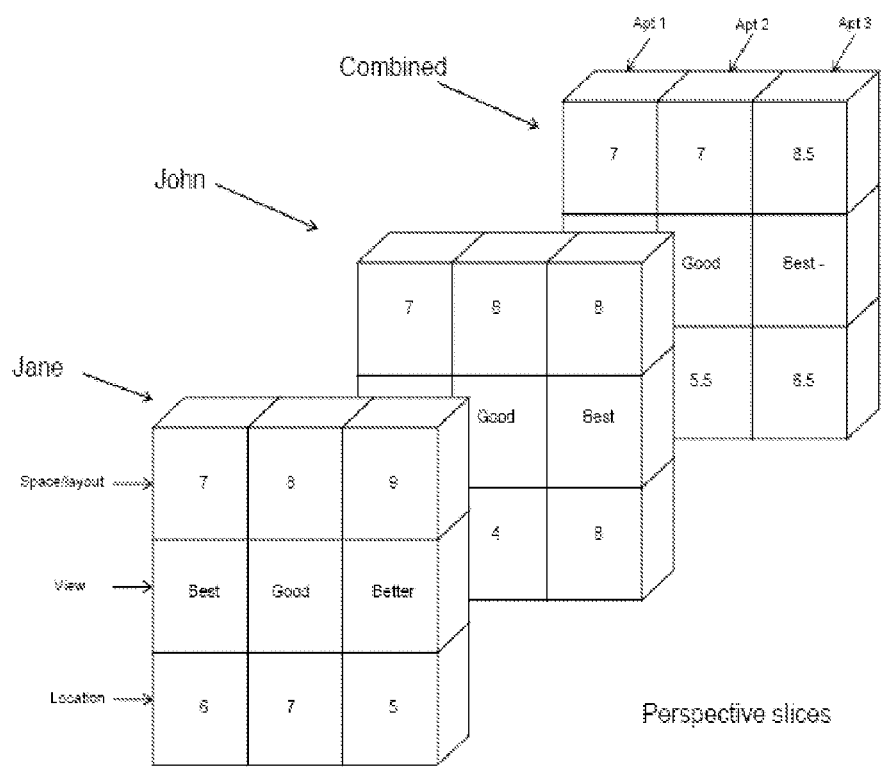
FIG. 39 shows the various perspective slices for the choicebox shown in FIG. 38.
Figure 40:
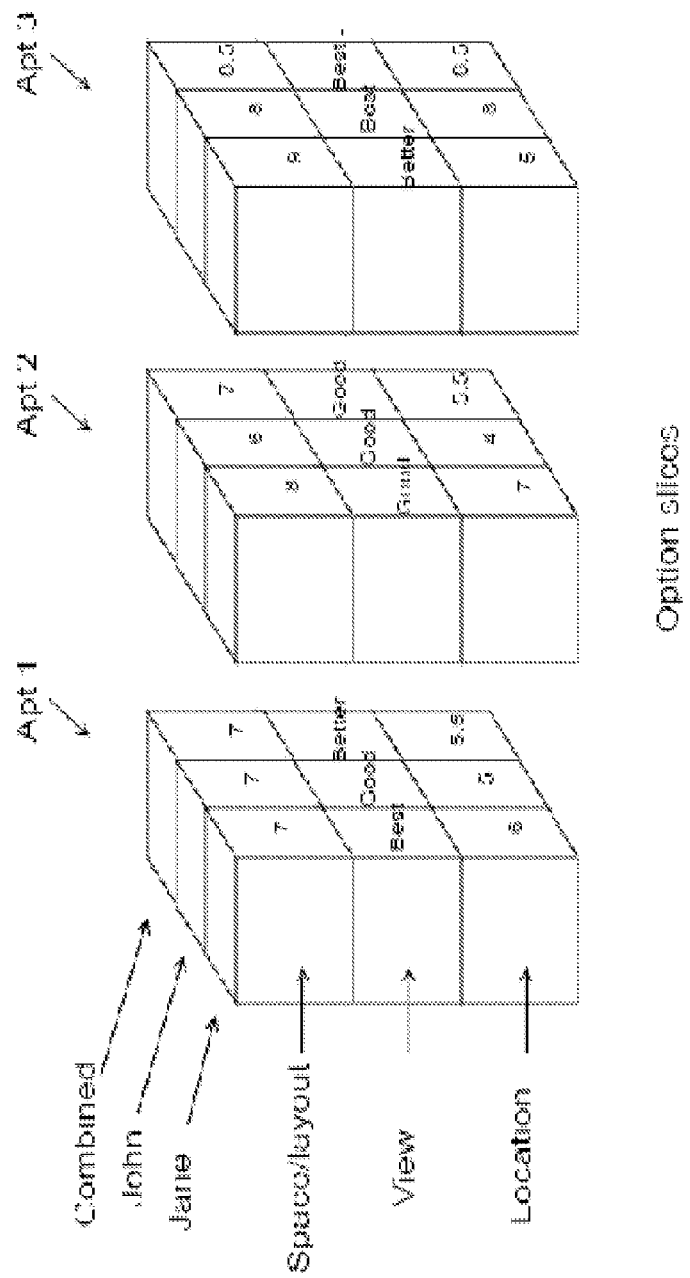
FIG. 40 shows the various option slices for the choicebox shown in FIG. 38.
Figure 41:
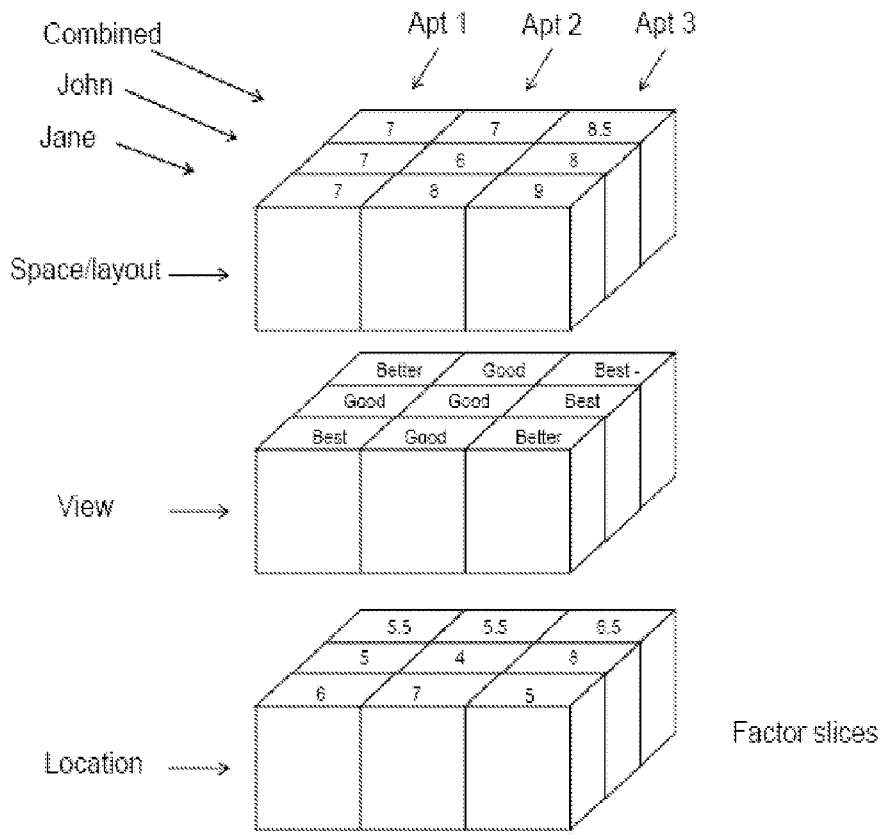
FIG. 41 shows the various factor slices for the choicebox shown in FIG. 38.

For example, a choicebox can be "sliced" along option, factor, and perspective axes. For example, from the view shown in FIG. 38, a user may select a perspective slice to view the ratings or scores for that perspective across all options and factors, may select an option slice to view the ratings or scores for that option across all perspectives, or may select a factor slice to view the ratings or scores for that factor across all perspectives. FIG. 39 shows the various perspective slices for the choicebox shown in FIG. 38. FIG. 40 shows the various option slices for the choicebox shown in FIG. 38. FIG. 41 shows the various factor slices for the choicebox shown in FIG. 38.

Figure 42:
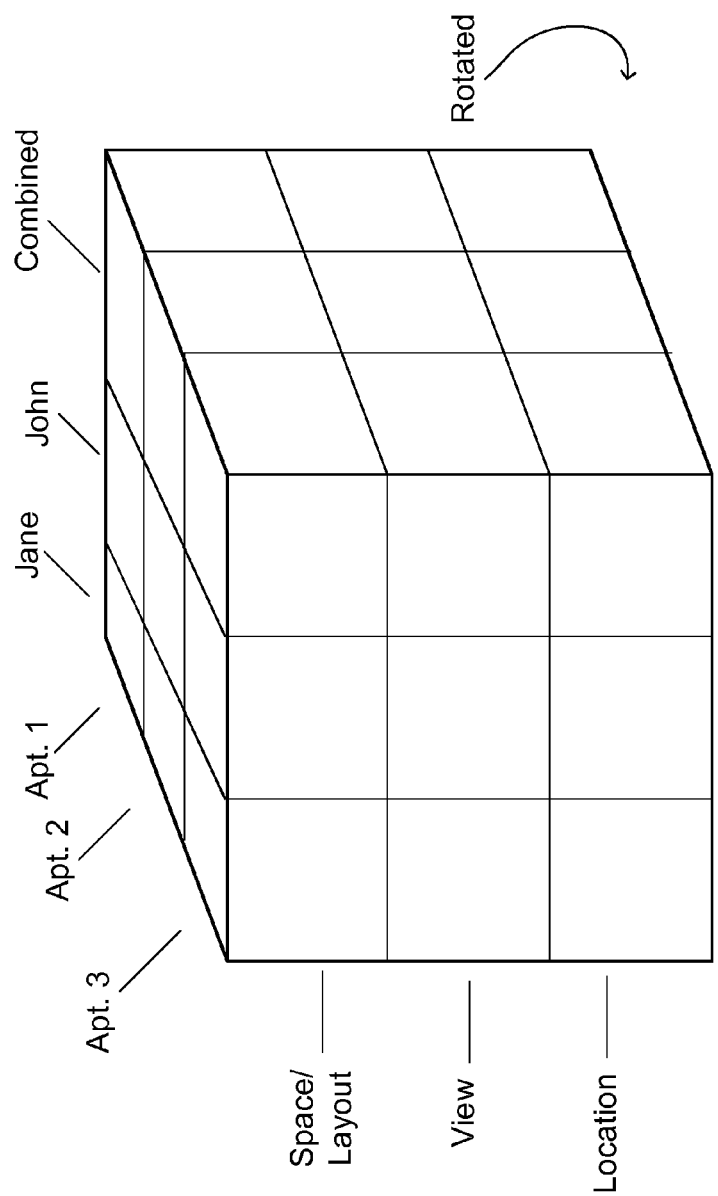
FIG. 42 shows the choicebox of FIG. 38 after being rotated about the y-axis.
Figure 43:
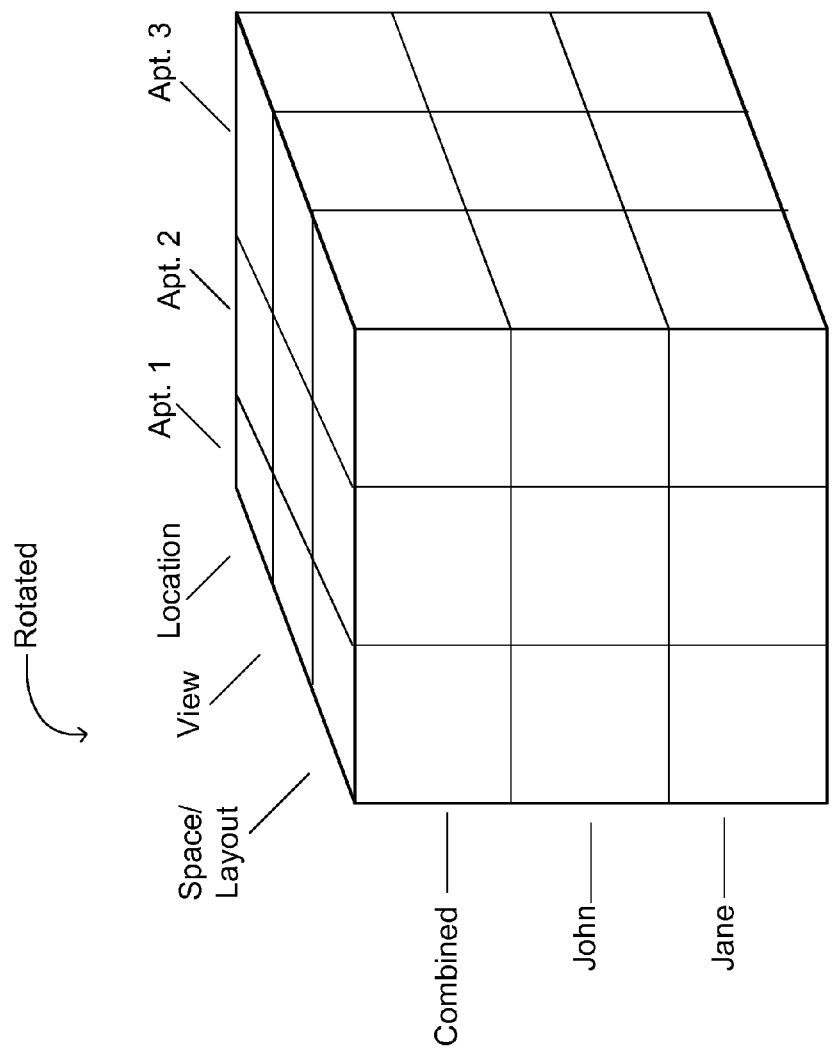
FIG. 43 shows the choicebox of FIG. 38 after being rotated about the x-axis.

The various slices may be selected in a variety of ways. For example, the user may be permitted to select a slice by selecting a tab or label associated with the desired option/factor/perspective (e.g., in FIG. 38, the user might select "Combined" to move the Combined perspective layer to the forefront, might select "Apt 2" to view the Apt 2 option slice, or might select "Space/layout" to view the Space/layout slice). Additionally or alternatively, the user may be permitted to access slices by rotating the choicebox (e.g., an option slice displaying all of the ratings across all perspectives for a single option may be accessed by rotating the choicebox of FIG. 38 about the y-axis as shown in FIG. 42, and a factor slice displaying all of the perspectives with respect to a given factor (or totals across factors) may be accessed by rotating the choicebox of FIG. 38 downward about the x-axis as shown in FIG. 43) using one or more rotation controls (e.g., rotate icons, dragging the corners of the choicebox, etc.). Since the user can reorder the layers in any of these orientations, all possible "slices" of the box can be accessed. Embodiments may provide other ways to select and manipulate the choicebox.

Views can differ in terms of which other box components are displayed, such as 'what's new' indicators and lists of other box participants. Tags and comments can be shown or hidden based on properties such as author, date, or type. Views can specify whether score totals or the summary layer should be shown at the moment. They can also differ in terms of which skin is applied (colors and other graphical elements) and whether any special visualizations are in place, such as one in which individual perspectives are rendered in 3D, with scores as the vertical dimension, or in which ratings from multiple perspectives are collapsed onto a single layer, and shown in different colors.

A user can create and store as many views as he or she likes for each box. The user can specify one to come up by default each time they view a box, or have the view default to the last view used for the box. Views can be shared among users, although their renderings may be different due to permission differences.

View templates that are box independent can also be made available (such as certain kinds of sorts, filters, or top 5.) A view of a public box, for instance, might show just the top ten factors (by average weight across perspectives) and top ten options (by overall score on those factors). One optional view might show the scoring functions for all factors on a single interactive chart.

Users can be given the ability to see another participant's view while editing in their own view.

Generally speaking, views are persistent, sessions are temporary.

Permission Management

Permissions within a choicespace and within particular choiceboxes are managed by allocating rights to users with respect to aspects of objects.

Rights may include such things as:
Seeing/reading
Adding
Deleting
Changing
Commenting and tagging
Objects include
Box properties
Structural elements (options, factors, perspectives)
Cells and regions within assessment matrices
Weights of factors on perspective and perspectives on factor
Tags and comments
Permissions themselves Aspects include
Content
Order Default permission states can be set and applied unless a more specific setting is affirmatively made for a particular object, such as Only box owners can specify the category or categories of a choice.

Only perspective owners can edit ratings, factor weights, and scoring functions on their perspectives All users can place comments and tags on whatever objects they can see.

All users can see all comments and tags associated with whatever objects they can see.

All users can add structural elements to a box (as suggestions), but only owners can put them into, or remove them from, the active assessment matrix.

Ratings, comments, and tags can only be changed or deleted by the person who entered them.

Permissions can be expressed via permission statements that identify users, rights, objects, and aspects with either direct or indirect references. E.g., Sally Jones is not allowed to see any parts of the assessment matrix other than her own perspective.

All choosers can see all perspectives once all owners have declared their perspectives provisionally finished.

Multi-User Editing

Since boxes generally can be viewed and edited by more than one person, sequentially or at the same time, the system typically includes various collision mitigation mechanisms. In exemplary embodiments, these may include such things as:

Presence indicators that show which participants have a live session with a box at any given time Sessions being in auto-commit mode by default, with all changes written to the database when made and all views updated Support for checking out a box or part of a box, during which time other participants cannot commit changes A 'track changes' mode in which revisions are marked when made by one participant, with that or another participant having the ability to accept or reject them.

In an exemplary embodiment, a given user typically can have and store as many views as he or she likes. The contents of assessment cells remain identical across views at any given time. Cells with computed-value totals typically reflect only those cells present in the current view, although computed-value totals optionally may include values from cells that are not visible. Views involve differences in what people see, not what they say.

Each session only involves one role and one view at a time, but users can have multiple sessions going, with differing roles and views of the same or different boxes.

Knowledge Base

A choicespace knowledge base includes a collection of categories organized into one or more directed graphs based on kind-of (sub-category) relationships. Because a category can have multiple parent categories and multiple child categories, these graphs are better described as heterarchies than hierarchies.

Each category in the knowledge base is associated with options, factors, perspectives, facts, tasks, and resources that have been entered in boxes that identify themselves in that category. (Note that a box can be in multiple categories.) Those associated objects can be sorted and filtered based upon their frequency of occurrence in the choicespace or specified sub-spaces. Associated options can be further sorted and filtered based upon the average overall score they have obtained in the choicespace or specified sub-spaces. Associated factors can be further sorted and filtered based upon the average overall weight they have been given in the choicespace or specified sub-spaces. Whether or not a suggestion is adopted (and how long it is retained in a box) can also be stored with a category-object association and used as another indicium of its relevance for that category.

A knowledge base is used, among other things, to suggest options, factors, perspectives, facts, tasks, and resources to users of boxes, based upon the category or categories they specify or can be taken to be dealing with. Because it is primarily built from group activity without manual intervention, it can be said to be socially produced and to learn as it is being used.

A knowledge base can have direct category-object associations, for instance those entered by analysts for particular categories. Authorized personnel can also specify category relationships and sameness relationships among objects.

The knowledge base also contains aggregate rating information for all option/factor combinations, current and historical, such as averages and standard deviations.

The knowledge base may also contain textual material about categories, e.g. for popular ones.

Because the category list is not a closed one, and users may choose an inappropriate one or make up an idiosyncratic name, exemplary embodiments typically use several techniques to maintain the coherence of the category graph. These include Probable sameness identification of categories based upon close similarity of leading elements associated with the categories.

Category inference for a given box based upon the options and factors present, to supplement nonstandard categories designated by users. (Once a user identifies a couple options and/or a couple factors, a category can often be inferred)

Techniques for inferring that an option or factor in a box is likely the same as a standard one in the choicespace.

Inferences from user behavior, such as that when a proffered object is declined, it may be because it is associated with too general a category (perhaps because some box owners did not designate sufficiently specific ones.)

Elements (like resources) and associations can be manually added to the knowledge base, for instances, based on results of searches or spidering processes that gather web content with inferred relevance to rating of option x on factor y.

Boxes can be sampled for correlation data whenever an object is added, removed, or significantly changed.

Suggestions for options, factors, and other box elements may be drawn from filtered and ranked category-element associations. A user in a box specified as (or inferred to be) dealing with a choice in category X can be shown the topmost elements associated with that category in the knowledge base, possibly filtered by associations occurring in boxes with users having similar demographic or psychographic profiles.

Suggestions can also be sorted based on how proximate the association is in the category graph, that is, how many nodes away the association is from the category of the subject box.

Suggestions for ratings are drawn from the aggregate ratings part of the knowledge base. These are primarily for objective feature information, where high uniformity of values across boxes for a given factor/option combination will give a user confidence of its accuracy. Aggregate ratings on subjective factors are more appropriately taken into account via a virtual 'community' perspective that can be added to a box.

In essence, then, the system can use the knowledge base to map collective preference spaces—e.g., using heterarchical structures to capture common correlations of factors and decision contexts, with server side data mining, folksonomies, and thesaurus building. As discussed below, the system may support virtual boxes that are assembled just in time to reflect options, factors, and perspectives on a given topic based on information in multiple actual boxes.

Boxcasting

Boxcasting is the activity of prefabricating a choicebox or box part and making it available for use. For example, a vendor might build a box that contains its offerings in a given category, factors it considers important, and ratings of those offerings in terms of those factors. Some or all of the perspective layers in which those pre-built components are expressed might be defined as unchangeable and undeletable by anyone who copies or otherwise uses a vendor's box. For example, such a user may be permitted to add other options, factors, perspective layers, and notes, but not eradicate or change what the vendor 'cast.'

Boxcasting may include such things as:
creating a starter box for a certain category that others can save personal copies of
offering perspective layers or other box parts that users can optionally import into their boxes
remotely updating such boxes and box parts even after they have been copied and are owned by someone else
remotely receiving anonymized information about activities involving such boxes The future behavior of boxcast material may not be entirely within the control of the ultimate box owner. For example, a consumer who saves a copy of a vendor's box may be able to add and edit their own layers, but not delete or change the vendor's layer, or avoid having new data being pushed to cells in such a layer. The consumer might even be prevented, within a choicebox environment, from directly copying such material to a new box in which those restrictions are not present, although the consumer may be able to manually replicate the material or import it, e.g., using a GridGrabber utility described herein.

Sponsorship

Sponsors are people or entities that underwrite the cost of choiceboxing, such as
suppliers of the kind of product or service being chosen
suppliers of related products or services
suppliers of services or products that help in choices of particular kinds
entities that simply want choosers in an area to have good information and tools, or to encourage them to take into account certain considerations Sponsorship can take the form of
boxcasting a box (which users may or may not be able to save personal copies of)
hosting boxes in the sponsor's own web environment
presenting a link in the resource pane of (or elsewhere in) relevant boxes (linkcasting)
presenting category-relevant links to choiceboxers that lead to options for users to import relevant box parts from the sponsor [row/column/layer casting]

The last mentioned form of sponsorship can be referred to as invertising—an "inverted" form of advertising in which autonomous choosers can invite potential choosees or other would-be influencers into their choices in progress and receive structured information and/or engage in conversations about the choice, each disclosing their identities only to the extent desired.

Invertising involves
Specifying under what circumstances and how a sponsored link should display
Specifying the behavior of the system when the link is clicked An invertisement can be designed to alert a chooser to a consideration they may not adequately be taking into account (in the view of the sponsor).

Choosers might be presented with the following options upon clicking a link
integrate an offering and its factors/ratings into a box as a new perspective
invite the sponsor in to comment on other options (and/or engage in competitive bidding) by making them a box participant with write access to that perspective
dismiss or defer (reserve item for later action)

As discussed above, sponsored links can help initiate chooser/sponsor conversations, one or both parties to which may choose to keep their identity undisclosed (so one may not always know who he or she is 'boxing' with).

A history of such encounters may be recorded, in case a chooser wants to revisit one previously dismissed.

Box Analytics

Analytical information about a choicebox can be supplied in a report or used to provide alerts or suggestions to users. Standard statistical techniques can be used to characterize variance among ratings, weights, and scoring functions and to identify aspects as to which there is most or least agreement among box participants. Inputs to which overall scores are especially sensitive can also be identified. Specialized measures for the choiceboxing context may include such things as:
Differentiating power (discussed above).
Ordinally settle-able options—(discussed above)
Key factor plot—Options can be plotted by their scores in a two or three dimensional grid, the axes of which are the two or three most differentiating factors. Vector length from the origin of the grid to the option's score coordinates is a measure of relative goodness (or betterness).

Importing Data

The system may allow choicebox users to import data (e.g., tabular data) from other sources. For example, a utility referred to herein as the Grid Grabber utility may allow a user to highlight and copy table-like regions on a web page, document, spreadsheet, or scan, automatically detect as much as possible about what options and factors the rows and columns may represent, and let the user interact with the material (e.g., in a 'what's what' stage) to ready it for importation into a new or existing box.

Users may alternatively submit the URL for a page with relevant content to initiate this process.

Similarly, utilities for importing parts from another box may be provided. For example, in order to import one or more box parts, the user might highlight cell(s), row(s), column(s), and/or layer(s) from a source box and issue a command to paste the information into a target box (these steps might happen in a single operation, e.g., accepting an invertiser's offer to supply material for a box). Once the information is imported, the system creates new rows, columns, and layers in the target box for any factors, options, and perspectives referenced in any of the copied material that do not bear the same choicespace GUID as ones in the target box. When a cell of imported material collides with an existing value in the source box (which should only happen when the GUIDs for all three elements are the same), the user is typically asked which to keep. After the import, the user can manually merge rows, columns, or layers, again being queried where multiple values would contend for a cell.

User-to-User Interaction

The system typically includes mechanisms that allow users to initiate communication (e.g., email, audio, video, screen-sharing, chat, instant messaging, audio and/or video conferencing, IP telephony, or other forms of communication) from within a session, e.g., with people who are simultaneously in the box, who are in similar boxes, who supply information (e.g., options, rating information, product information, etc.), or who have previously had or will prospectively have such a role.

For example, when working in a choicebox such as the one shown in FIG. 30, the user may be permitted to select (e.g., by right-clicking or otherwise) the tab associated with a perspective in order to initiate communication with the owner(s) of that perspective, e.g., from a menu of communication options displayed when the tab is selected. The system may track users who are working on a particular choicebox and may highlight the tabs of other users who are currently in the box (e.g., by including a special icon on the tab, by changing the shape of the tab, by changing the color of the tab, or otherwise) or may provide a list or menu of other users currently in the box (e.g., on the screen or accessible from the screen, e.g., by selecting a tab that pulls up the list or menu). It should be noted that not all users working on a choicebox will necessarily have individual tabs/perspectives.

Similarly, the system may identify choiceboxes that are related by some attribute (e.g., category) and may allow users of one choicebox to communicate with users of other choiceboxes. The users may exchange information (e.g., regarding options and factors) or may comment within or copy parts of each others' choiceboxes. Since there may be multiple choiceboxes associated with the same or similar type of decision in existence, perhaps having the same or different options, factors, scoring functions, and other parameters, the system may provide a search utility to permit users to search for relevant choiceboxes and/or for people who may be interested in participating in a choicebox.

Users of a choicebox may invite others to join the choicebox. For example, the system may provide an invitation mechanism through which relevant users may be identified and contacted. Invitees may choose, for example, to join the choicebox, to ignore the invitation, or to take other actions. Invitations may be made through the choicebox system (e.g., through subscribers to the system) or through other mechanisms (e.g., through emails, social websites, etc.).

Social Networking

Choiceboxing can be highly "social" in at least two complementary ways. First, choosers can collaboratively deliberate with fellow choosers and other participants in specific boxes, either asynchronously or in real time. The boxes serve as a medium for interaction and communication. Second, actors in a choicespace can contribute to and benefit from a shared pool of knowledge. They can interact with the existing community of fellow actors (e.g., through a "blackboard" or "wall" on which users can post messages or through other communication mechanisms like email or text messages), and draw upon their broader contacts and networks to expand that community. An actor can parameterize searches and suggestion requests so as to limit them to boxes belonging to 'people like me' or other sub-communities.

Actors can identify fellow actors as friends, family members, or advisers and grant them access to one or more boxes they own, and users may be permitted to request access to a box. A choicebox may be associated with a group of users, which may be given its own name/identifier. Alerts and other typical features of a social network can be made available. Actors who are members of an external social network that cooperates with a choice service provider may be empowered to maintain summaries and links to their boxes as part of the content they share within that network. They may also provide alerts and updates there, and invite friends in that network to participate in boxes. The system may automatically distribute messages sent by one user to other group members.

Communication within the community/space may be signaled via box flags, such as "help wanted" or "willing to help with other decisions like this."

The system typically supports the ability to explore neighboring boxes in choice space, e.g., to support ad hoc communities of common choice.

Boxcasting and cellcasting (e.g., methods for suppliers of information and evaluative data to broadcast it to choosers with relevant boxes) support online/social networking.

Choosers and choosees can be brought together for transactions that appear mutually desirable given the state of a choicebox.

Social production techniques may be used to gather choice support content, for example, by providing bi-directional content exchange between usage sessions and an evolving knowledge base; tracking correlations of factors, options, and categories by noting co-occurrences within choice sessions; maintaining statistics about the weights accorded to factors and ratings given to options; collecting scoring functions and records of purchases and other decisions; collecting supporting information like useful resources (such as websites and publications) and correlating it with factors, options, or categories; and providing a folksonomy and thesauri through which users can share common meanings but also use their own preferred terms for options and factors.

Various aspects of choiceboxing may form the basis of a separate online/social networking service (e.g., free, subscription, advertisement-supported, etc.) or may be integrated with existing online/social networking services. For example, choiceboxing may be integrated with search engines (e.g., GOOGLE™, YAHOO™, etc.), social networks (e.g., FACEBOOK™, LINKEDIN™, YOUTUBE™, MYSPACE™, etc.), vendor websites (e.g., BESTBUY™, etc.), and other types of online/social networking services, which may allow users to spawn choiceboxes based on such things as search requests, search results, chat/discussion exchanges (e.g., a group trying to decide where to have dinner might spawn a choicebox), email/text messages (e.g., the system might suggest a new or existing choicebox based on the subject matter of the messages), and other information. Thus, a choicebox system may become its own social website, with subscriptions, user groups, communication mechanisms, online commerce, sponsorship/advertising, and other elements.

Model Boxes, Virtual Boxes, Wish Boxes, and Master Boxes

Users may create and maintain boxes for purposes other than assisting in the making of a present choice. Some examples include:

Users may create a box to serve as a model for themselves or others, containing options and factors commonly found in a category, along with ratings, facts to be specified, tasks to be done, useful resources, and other materials. In effect a template, the box can be copied for use in connection with a particular choice. Owners of such boxes may make them public, or just available to specified other actors.

A choice service provider may make virtual boxes available that summarize the best thinking of the community in particular choice categories. Such a 'big box' might contain the ten options with the highest average of overall scores in boxes in that category, the ten factors with the highest average differentiating power, and a virtual perspective that show the average ratings of those options on those factors. It may also include perspectives associated with actors who have strongly positive reputations. Users starting a choice in that category could make a copy of such a box (in effect an automated model), and add, hide, or delete options and factors as they see fit.

A user may create a box that starts out option-less, but contains factors with customized scoring functions, defining what the user would find acceptable and preferable. (In effect saying, "I'm looking for a good . . . ") Such a "wish box" could be flagged in choicespace as one on which responses are requested, or used as a search specification to find options that would score most highly on the included factors based on ratings in other similar boxes.

Actors that find themselves being asked to provide input on related matters in a variety of boxes may create boxes to record an array of ratings across a wide array of options and factors. Parts of such boxes can in effect project themselves as perspectives in existing or new boxes where the recipient box owner so agrees. Such actors can alternatively copy or clone ratings from such a 'master' box, and conversely, write back to a master box from a particular perspective being worked on elsewhere.

Box Entanglement

Boxes can be designed to coordinate the separate but related decision processes of parties to a mutual choice, such as a prospective employer and employee deciding whether to make/accept a job offer, or parties to a dispute or a business opportunity deciding whether to proceed with a particular settlement or deal. While this can sometimes be accomplished by multiple perspectives within one box, it is often better done by setting up boxes for each of the parties involved, in each of which one is the designated beneficiary. Each party will typically have options in addition to the one that they share. The boxes can be 'entangled' by making the overall rank of the common choice to one party (as presently determined in their box) the rating of a factor in the box of the other party. That factor represents the optimality of the option to the counterparty. An employer, for instance, may want to extend offers to candidates who would most prefer to work for them over other employers, and an employee may want to accept the offer of the prospective employer who would find them most valuable to have as an employee.

Entanglement can be arranged with more than two parties. It requires the permission of all box owners involved. The parties may also agree to allow each other to view and comment in their boxes, for example to point out considerations a party believes the other party is not adequately taking into account, and that may favor it over other options.

Choicebox Commerce

Virtually every aspect of choiceboxing can be used for commerce (e.g., buying/selling, trading/bartering, etc.).

For example, a CSP might choose to charge for such things as accessing the choicespace, participating in a choicebox, advertising, sponsoring a choicebox, importing/exporting boxes or sub-boxes, communicating with other users, etc.

Also, the CSP may allow products and services to be purchased directly from a choicebox, e.g., by providing links to vendors associated with the options being considered in a choicebox (e.g., e.g., by offering a discount, extra warranties, etc.). Partnerships between the CSP and vendors may be formed, and the CSP may receive a commission when users purchase through a choicebox.

As mentioned above, choiceboxing may be applied to RFP/RFQ and other procurement processes. For example, a procuring entity may cast a box and invite bidders to submit mutually invisible layers.

Miscellaneous

It should be noted that, as discussed above, the present invention is not limited to specific rating schemes, scoring functions, totaling functions, and other logic (e.g., logic for computing differentiating powers). The exemplary embodiments described above generally use straight-forward mechanisms for the sake of simplicity and to facilitate discussion of types of functions that can be supported by choiceboxing. Embodiments may include different and/or more complex mechanisms that may be user-configurable or set by the system owner.

It should be noted that terms such as "server" are used herein to describe various communication devices that may be used in a communication system, and should not be construed to limit the present invention to any particular communication device type. Thus, a communication device may include, without limitation, a bridge, router, bridge-router (brouter), switch, node, server, computer, or other communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

It should be noted that headings are included above purely for convenience and should not be construed to limit the invention in any way.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computerized method for supporting the making of decisions by one or more decision-making participants, the method comprising:
   in a first computer process, maintaining a repository for storing one or more data sets, each data set including a three-dimensional assessment matrix characterizing one or more options for a decision in terms of one or more factors according to one or more perspectives, each perspective including a rating for each option for each factor and a scoring function for each factor; and
   in a second computer process, providing access to the repository via a graphical user interface to support interactive decision-making through user-selectable views of data sets including conceptual three-dimensional box views in which the options, factors, and perspectives of an assessment matrix are selectively mapped to the three dimensions of a box and also including conceptual two-dimensional slice views for individual options, factors, and perspectives of the box.

2. A method according to claim 1, wherein the graphical user interface can display in box views a summary perspective representing a combination of the perspectives, and wherein the graphical user interface can display, for each perspective, a total score for each option calculated based on the ratings and scoring parameters for each factor in the perspective.

3. A method according to claim 2, wherein each perspective includes an independent set of weights for the various factors, and its own weights relative to other perspectives, so that each factor has a weight in each perspective and each perspective has a weight for each factor, and wherein the combination of the perspectives is based on the perspective weights.

4. A method according to claim 1, wherein the options and factors are selectively mapped to two orthogonal column and row axes of a box and the perspectives are selectively mapped as layers along a third orthogonal axis of the box, where each cell at the intersection of a column, row, and layer represents the characterization of some option in terms of some factor according to some perspective.

5. A method according to claim 1, wherein the graphical user interface allows users to interactively add, remove, and hide options, factors and perspectives and interactively rotate boxes and re-order box layers for box views.

6. A method according to claim 1, wherein the graphical user interface allows users to search for information that is relevant to a particular data set, including options, factors, and other data sets, based on specified decision categories or other criteria, and to import and integrate the information into the assessment matrix of the particular data set.

7. A method according to claim 1, wherein at least one of:
   the graphical user interface can include links to relevant resources including sponsor links,
   information provided by the sponsor can be integrated as a new perspective in the assessment matrix of a data set,
   information can be imported from an assessment matrix provided by the sponsor, or
   information can be dynamically added by the sponsor into the new perspective.

8. A method according to claim 1, wherein the graphical user interface allows data sets to be viewed independently in different forms by multiple users and allows users to communicate for collaborating on the decision being considered using a data set including allowing users to invite other users to participate in a decision using a data set, wherein each participant can work in one or more perspectives of the assessment matrix of the data set.

9. A method according to claim 1, wherein the graphical user interface allows users to initiate commercial or non-commercial transactions related to the decision being considered including allowing users to distribute data sets and portions of data sets.

10. A method according to claim 1, wherein the graphical user interface allows ratings, weights, and scoring functions to be specified in ordinal terms for approximate ordering of options.

11. A method according to claim 1, wherein the graphical user interface can display the differentiating power of factors based on degree of variance in ratings of options and weights of factors and perspectives.

12. A method according to claim 1, further comprising:
selectively ranking and characterizing options in terms of their relative betterness, computed from scores that in turn are computed from ratings via scoring functions.

13. A method according to claim 1, further comprising:
mining information from the data sets stored in the repository and interactions with the data sets;
storing the mined information in a knowledge base; and
providing via the graphical user interface suggestions for options, factors, perspectives, resources, facts or tasks for a data set, the suggestions derived from the mined information in the knowledge base based on at least one of a category associated with the decision, information in the data set, and participants associated with the data set.

14. A method according to claim 1, wherein at least one of:
the graphical user interface allows a user to cast a prefabricated data set for use by others,
such subsequent users of the prefabricated data set can be provided with updates made to the data set, or
the user is provided with information about others' activities involving the data set.

15. A method according to claim 1, wherein the user-selectable views include slidebox views, wherein at least one slidebox view includes, for each factor in a perspective, a single rating column in which all of the options have a conceptual 'lane' on which a sliding box signifies both ratings and scores, where the horizontal position of each box reflects the rating of an option on a factor, its width is proportionate to the normalized score corresponding to that rating, its height is proportionate to the weight assigned to the factor on the perspective, its depth is proportionate to the weight assigned to the perspective on the factor, and the boxes can be moved along the lane to change a rating.

16. A method according to claim 1, wherein the user-selectable views include value-volumetric views in which three-dimensional shapes are used to signify the relative volume of positive and negative value represented by specific options on specific factors in a perspective, and cumulatively for each option across all factors in a perspective.

17. A method according to claim 1, wherein options, factors, and perspectives can exist in composite form, with ratings drawn from those of elements that are defined as contributing to the composite element.

18. A method according to claim 1, wherein the graphical user interface allows users to manage collections of data sets in categories that involve simultaneous, interacting choices, and wherein the graphical user interface allows users to entangle a plurality of data sets by making the overall score of a common choice in one party's data set the rating of a factor in the data set of another party.

19. A method according to claim 1, wherein the graphical user interface allows users to create at least one of:
data set templates,
virtual data sets,
data sets that start out option-less but contain factors with customized scoring functions defining what a particular user would find acceptable and preferable, or
master data sets to record an array of ratings across an array of options and factors for a plurality of related matters.

20. A system for supporting the making of a decision by one or more decision-making participants, the system comprising:
a repository for storing one or more data sets, each data set including a three-dimensional assessment matrix characterizing one or more options for a decision in terms of one or more factors according to one or more perspectives, each perspective including a rating for each option for each factor and a scoring function for each factor; and
a graphical user interface in communication with the repository, wherein the graphical user interface provides access to the repository to support interactive decision-making through user-selectable views of data sets including conceptual three-dimensional box views in which the options, factors, and perspectives of an assessment matrix are selectively mapped to the three dimensions of a box and also including conceptual two-dimensional slice views for individual options, factors, and perspectives of the box.

21. A system according to claim 20, wherein the graphical user interface can display in box views a summary perspective representing a combination of the perspectives, and wherein the graphical user interface can display, for each perspective, a total score for each option calculated based on the ratings and scoring parameters for each factor in the perspective.

22. A system according to claim 21, wherein each perspective includes an independent set of weights for the various factors, and its own weights relative to other perspectives, so that each factor has a weight in each perspective and each perspective has a weight for each factor, and wherein the combination of the perspectives is based on the perspective weights.

23. A system according to claim 20, wherein the options and factors are selectively mapped to two orthogonal column and row axes of a box and the perspectives are selectively mapped as layers along a third orthogonal axis of the box, where each cell at the intersection of a column, row, and layer represents the characterization of some option in terms of some factor according to some perspective.

24. A system according to claim 20, wherein the graphical user interface allows users to interactively add, remove, and hide options, factors and perspectives and interactively rotate boxes and re-order box layers for box views.

25. A system according to claim 20, wherein the graphical user interface allows users to search for information that is relevant to a particular data set, including options, factors, and other data sets, based on specified decision categories or other criteria, and to import and integrate the information into the assessment matrix of the particular data set.

26. A system according to claim 20, wherein at least one of
the graphical user interface can include links to relevant resources including sponsor links,
information provided by the sponsor can be integrated as a new perspective in the assessment matrix of a data set,
information can be imported from an assessment matrix provided by the sponsor, or
information can be dynamically added by the sponsor into the new perspective.

27. A system according to claim 20, wherein the graphical user interface allows data sets to be viewed independently in different forms by multiple users and allows users to communicate for collaborating on the decision being considered using a data set including allowing users to invite other users to participate in a decision using a data set, wherein each participant can work in one or more perspectives of the assessment matrix of the data set.

28. A system according to claim 20, wherein the graphical user interface allows users to initiate commercial or non-commercial transactions related to the decision being considered including allowing users to distribute data sets and portions of data sets.

29. A system according to claim 20, wherein the graphical user interface allows ratings, weights, and scoring functions to be specified in ordinal terms for approximate ordering of options.

30. A system according to claim 20, wherein the graphical user interface can display the differentiating power of factors based on degree of variance in ratings of options and weights of factors and perspectives.

31. A system according to claim 20, wherein options can be ranked and characterized in terms of their relative betterness, computed from scores that in turn are computed from ratings via scoring functions.

32. A system according to claim 20, wherein information is mined from the data sets stored in the repository and interactions with the data sets and stored in a knowledge base, and wherein the graphical user interface can provide suggestions for options, factors, perspectives, resources, facts or tasks for a data set, the suggestions derived from the mined information in the knowledge base based on at least one of a category associated with the decision, information in the data set, and participants associated with the data set.

33. A system according to claim 20, wherein at least one of:
   the graphical user interface allows a user to cast a prefabricated data set for use by others,
   such subsequent users of the prefabricated data set can be provided with updates made to the data set, or
   the user is provided with information about others' activities involving the data set.

34. A system according to claim 20, wherein the user-selectable views include slidebox views, wherein at least one slidebox view includes, for each factor in a perspective, a single rating column in which all of the options have a conceptual 'lane' on which a sliding box signifies both ratings and scores, where the horizontal position of each box reflects the rating of an option on a factor, its width is proportionate to the normalized score corresponding to that rating, its height is proportionate to the weight assigned to the factor on the perspective, its depth is proportionate to the weight assigned to the perspective on the factor, and the boxes can be moved along the lane to change a rating.

35. A system according to claim 20, wherein the user-selectable views include value-volumetric views in which three-dimensional shapes are used to signify the relative volume of positive and negative value represented by specific options on specific factors in a perspective, and cumulatively for each option across all factors in a perspective.

36. A system according to claim 20, wherein options, factors, and perspectives can exist in composite form, with ratings drawn from those of elements that are defined as contributing to the composite element.

37. A system according to claim 20, wherein the graphical user interface allows users to manage collections of data sets in categories that involve simultaneous, interacting choices, and wherein the graphical user interface allows users to entangle a plurality of data sets by making the overall score of a common choice in one party's data set the rating of a factor in the data set of another party.

38. A system according to claim 20, wherein the graphical user interface allows users to create at least one of:
   data set templates,
   virtual data sets,
   data sets that start out option-less but contain factors with customized scoring functions defining what a particular user would find acceptable and preferable, or
   master data sets to record an array of ratings across an array of options and factors for a plurality of related matters.

39. A method according to claim 15, wherein the boxes are automatically resized and repositioned as a user changes ratings and weights, or ratings and weights are automatically changed as a user changes the size and position of a box.

40. A method according to claim 16, wherein the user-selectable views include views in which scores are expressed as value boxes that can be directly manipulated by users.

41. A system according to claim 34, wherein the boxes are automatically resized and repositioned as a user changes ratings and weights, or ratings and weights are automatically changed as a user changes the size and position of a box.

42. A system according to claim 35, wherein the user-selectable views include views in which scores are expressed as value boxes that can be directly manipulated by users.

* * * * *